(12) United States Patent
Rho et al.

(10) Patent No.: US 11,747,712 B2
(45) Date of Patent: Sep. 5, 2023

(54) CAMERA MODULE AND ELECTRONIC DEVICE INCLUDING THE SAME

(71) Applicant: Samsung Electronics Co., Ltd., Suwon-si (KR)

(72) Inventors: Hyungjin Rho, Suwon-si (KR); Hwajoong Jung, Suwon-si (KR); Youngbok Yu, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 17/144,629

(22) Filed: Jan. 8, 2021

(65) Prior Publication Data

US 2021/0215945 A1 Jul. 15, 2021

(30) Foreign Application Priority Data

Jan. 10, 2020 (KR) .......................... 10-2020-0003933

(51) Int. Cl.
*H04N 23/54* (2023.01)
*H04N 23/57* (2023.01)
(Continued)

(52) U.S. Cl.
CPC ................. *G03B 5/00* (2013.01); *G03B 3/10* (2013.01); *H04N 23/54* (2023.01); *H04N 23/57* (2023.01);
(Continued)

(58) Field of Classification Search
CPC ...... G03B 3/10; G03B 13/36; G03B 2205/00; G03B 2205/0007–0038;
(Continued)

(56) References Cited

U.S. PATENT DOCUMENTS

| | | |
|---|---|---|
| 3,903,230 A | 9/1975 | Kamigaito et al. |
| 8,238,736 B2 | 8/2012 | Tsuruta et al. |

(Continued)

FOREIGN PATENT DOCUMENTS

| | | | | |
|---|---|---|---|---|
| CN | 101685235 A | * | 3/2010 | ............ B01J 23/745 |
| CN | 208795909 U | * | 4/2019 | ......... G02B 13/0015 |

(Continued)

OTHER PUBLICATIONS

International Search Report dated Apr. 27, 2021, issued in International Application No. PCT/KR2021/000277.
(Continued)

*Primary Examiner* — Paul M Berardesca
(74) *Attorney, Agent, or Firm* — Jefferson IP Law, LLP

(57) ABSTRACT

A portable communication device is provided. The device includes a camera assembly comprising a lens and an image sensor, a printed circuit board (PCB) surrounding at least a portion of the camera assembly, and a plurality of coils including a first, second, and third coils respectively disposed on first, second, and third areas of the PCB, and a control circuit electrically connected to the PCB, the first coil, the second coil, and the third coil. The control circuit performs a first function related to the camera assembly by moving the camera assembly, by using the first coil, in a direction substantially parallel to an optical axis of the lens, and a second function related to the camera assembly by rotating the camera assembly about at least one rotation shaft, which is substantially perpendicular to the optical axis, using at least one of the second coil or the third coil.

20 Claims, 25 Drawing Sheets

(51) Int. Cl.
*H04N 23/68* (2023.01)
*G03B 5/00* (2021.01)
*G03B 3/10* (2021.01)

(52) U.S. Cl.
CPC ... *H04N 23/687* (2023.01); *G03B 2205/0023* (2013.01); *G03B 2205/0069* (2013.01)

(58) Field of Classification Search
CPC .. G03B 2205/0053–0084; G03B 30/00; H04N 5/2253; H04N 5/2254; H04N 5/2257; H04N 5/23212; H04N 5/2328; H04N 5/23287; G02B 27/64; G02B 27/646; H04M 1/0264
See application file for complete search history.

(56) References Cited

U.S. PATENT DOCUMENTS

| | | | |
|---|---|---|---|
| 9,332,188 B2 | 5/2016 | Fakei et al. | |
| 9,549,109 B2 | 1/2017 | Kim et al. | |
| 9,618,770 B2 | 4/2017 | Park et al. | |
| 9,726,899 B2 | 8/2017 | Kim et al. | |
| 9,885,881 B2 | 2/2018 | Kim et al. | |
| 9,891,444 B2 | 2/2018 | Minamisawa | |
| 9,979,869 B2 | 5/2018 | Park et al. | |
| 10,429,722 B2 | 10/2019 | Rho et al. | |
| 10,444,530 B2 | 10/2019 | Park et al. | |
| 10,527,866 B2 | 1/2020 | Chung et al. | |
| 11,209,663 B2 | 12/2021 | Park et al. | |
| 2011/0103782 A1 | 5/2011 | Tsuruta et al. | |
| 2013/0121672 A1 | 5/2013 | Shikama et al. | |
| 2014/0139693 A1 | 5/2014 | Takei et al. | |
| 2015/0256727 A1 | 9/2015 | Kim et al. | |
| 2016/0170227 A1 | 6/2016 | Minamisawa | |
| 2017/0171440 A1 | 6/2017 | Park et al. | |
| 2018/0067379 A1 | 3/2018 | Rho et al. | |
| 2018/0180900 A1 | 6/2018 | Chung et al. | |
| 2021/0215903 A1* | 7/2021 | Rho | G03B 13/36 |
| 2021/0227141 A1* | 7/2021 | Seo | G02B 13/0015 |
| 2021/0240000 A1* | 8/2021 | Kasahara | G02B 7/02 |
| 2021/0373353 A1* | 12/2021 | Hagiwara | G03B 5/00 |
| 2022/0075202 A1 | 3/2022 | Park et al. | |
| 2022/0224807 A1 | 7/2022 | Lu et al. | |

FOREIGN PATENT DOCUMENTS

| | | | | |
|---|---|---|---|---|
| CN | 110475056 A | * | 11/2019 | ........... H04N 5/2251 |
| CN | 110572556 A | | 12/2019 | |
| EP | 2938063 A2 | | 10/2015 | |
| EP | 3293572 A2 | | 3/2018 | |
| KR | 10-2019-0029169 A | | 3/2019 | |

OTHER PUBLICATIONS

Extended European Search Report dated Dec. 9, 2022, issued in European Patent Application No. 21738241.5-1208.

* cited by examiner

CAMERA MODULE AND ELECTRONIC DEVICE INCLUDING THE SAME

CROSS-REFERENCE TO RELATED APPLICATION(S)

This application is based on and claims priority under 35 U.S.C. § 119(a) of a Korean patent application number 10-2020-0003933, filed on Jan. 10, 2020, in the Korean Intellectual Property Office, the disclosure of which is incorporated by reference herein in its entirety.

BACKGROUND

1. Field

The disclosure relates to a camera module and an electronic device including the same.

2. Description of Related Art

An electronic device may include one or more camera modules. The camera module may have an auto focusing function by which a lens moves in an optical axis direction in order to provide auto focusing of the lens. The electronic device may have a function of compensating for shaking of the camera module. For example, in the function of compensating for shaking, the lens may move in a direction other than the optical axis direction in order to compensate for vibration applied to the camera module.

SUMMARY

The camera module may support various functions. For example, the camera module may include at least one of a function related to image stabilization or a function related to auto focusing. For example, in the camera module, only a lens may move or rotate, and an image sensor is fixed if a function related to image stabilization operates, and thus, an acquired image may be deteriorated in quality.

Aspects of the disclosure are to address at least the above-mentioned problems and/or disadvantages and to provide at least the advantages described below. Accordingly, an aspect of the disclosure is to provide an electronic device including a camera module having an auto focusing function by which a lens moves in an optical axis direction and a function by which the lens rotates and moves about at least two axes.

Additional aspects will be set forth in part in the description which follows and, in part, will be apparent from the description, or may be learned by practice of the presented embodiments.

In accordance with an aspect of the disclosure, a portable communication device is provided. The portable communication device includes a camera assembly including a lens and an image sensor, a printed circuit board (PCB) surrounding at least a portion of the camera assembly, a plurality of coils electrically connected to the PCB, wherein the plurality of coils includes a first coil disposed on a first area of the PCB, a second coil disposed on a second area of the PCB, and a third coil disposed on a third area of the PCB, and a control circuit electrically connected to the PCB, the first coil, the second coil, and the third coil, wherein the control circuit is set in order to perform a first function related to the camera assembly by moving the camera assembly by using the first coil in a direction substantially parallel to an optical axis of the lens, and perform a second function related to the camera assembly by rotating the camera assembly about at least one rotation shaft, which is substantially perpendicular to the optical axis, by using at least one of the second coil or the third coil.

In accordance with another aspect of the disclosure, a portable communication device is provided. The portable communication device includes a lens assembly including a lens, a camera assembly including a lens and an image sensor, a plurality of printed circuit boards (PCB) surrounding at least a portion of the camera assembly, wherein the plurality of PCBs include a first PCB and a second PCB, a plurality of coils electrically connected to the plurality of PCB and including a first coil, a second coil, and a third coil, wherein at least one of the first coil, the second coil, or the third coil is disposed on the first PCB, and at least the other of the first coil, the second coil, or the third coil is disposed on the second PCB, and a control circuit electrically connected to the plurality of PCBs and the plurality of coils, wherein the control circuit is set in order to perform a first function related to the camera assembly by moving the camera assembly by using the first coil in a direction that is substantially parallel to an optical axis L of the lens, and perform a second function related to the camera assembly by rotating the camera assembly about at least one rotation shaft, which is substantially perpendicular to the optical axis, by using at least one of the second coil or the third coil.

In accordance with another aspect of the disclosure, a camera module is provided. The camera module includes a camera assembly including a lens and an image sensor, a printed circuit board (PCB) surrounding at least a portion of the camera assembly, a plurality of coils electrically connected to the PCB, wherein the plurality of coils include a first coil disposed on a first area of the PCB, a second coil disposed on a second area of the PCB, and a third coil disposed on a third area of the PCB, and a controller electrically connected to the PCB and the plurality of coils, wherein the controller is set in order to perform a first function related to the camera assembly by moving the camera assembly by using the first coil in a direction substantially parallel to an optical axis of the lens, and perform a second function related to the camera assembly by rotating the camera assembly about at least one rotation shaft, which is substantially perpendicular to the optical axis, by using at least one of the second coil or the third coil.

In accordance with another aspect of the disclosure, a portable communication device is provided. The portable communication device includes a housing defining at least a portion of an outer surface of the portable communication device, a display accommodated in the housing, and a camera assembly, wherein the camera assembly includes a first camera housing, a lens assembly at least partially accommodated in the first camera housing and including a plurality of lenses, an image sensor accommodated in the first camera housing, a printed circuit board at least partially surrounding the first camera housing, wherein the printed circuit board includes a first area corresponding to a first side surface of the first camera housing, a second area corresponding to a second side surface of the first camera housing, which is adjacent to the first side surface, and a third area corresponding to a third side surface of the first camera housing, which is adjacent to the second side surface and faces the first side surface, and a first coil disposed on the first area, a second coil disposed on the second area, and a third coil disposed on the third area, and a processor functionally connected to the camera assembly, wherein the processor is set in order to perform a first function related to the camera assembly by moving the camera assembly by using the first coil in a direction substantially parallel to an optical axis of at least one lens of the plurality of lenses, and perform a second function related to the camera assembly by moving the camera assembly about at least one rotation shaft, which is substantially perpendicular to the optical axis, by using at least one of the second coil or the third coil.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
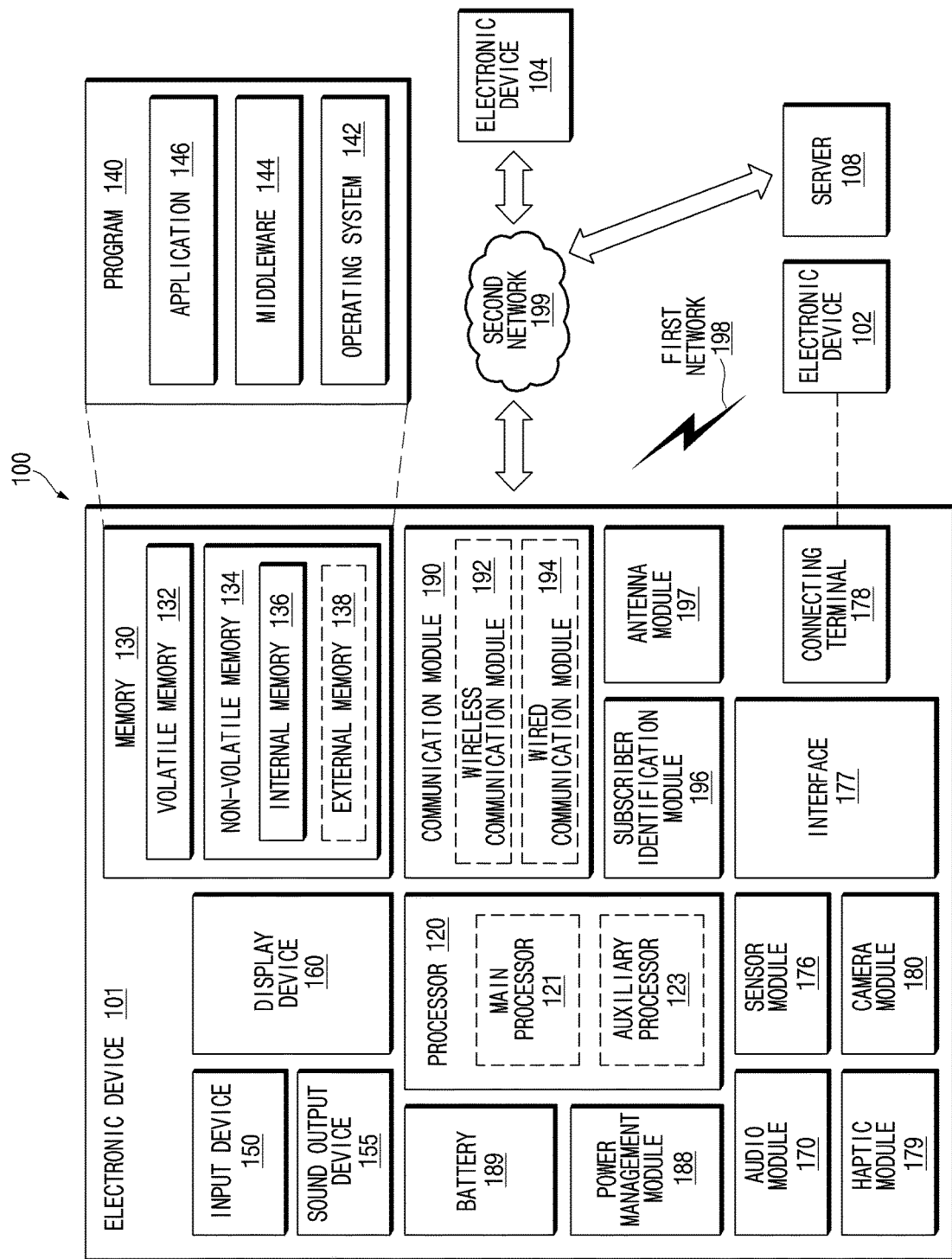
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module (or device) 155, a display module (or device) 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display module 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display module 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
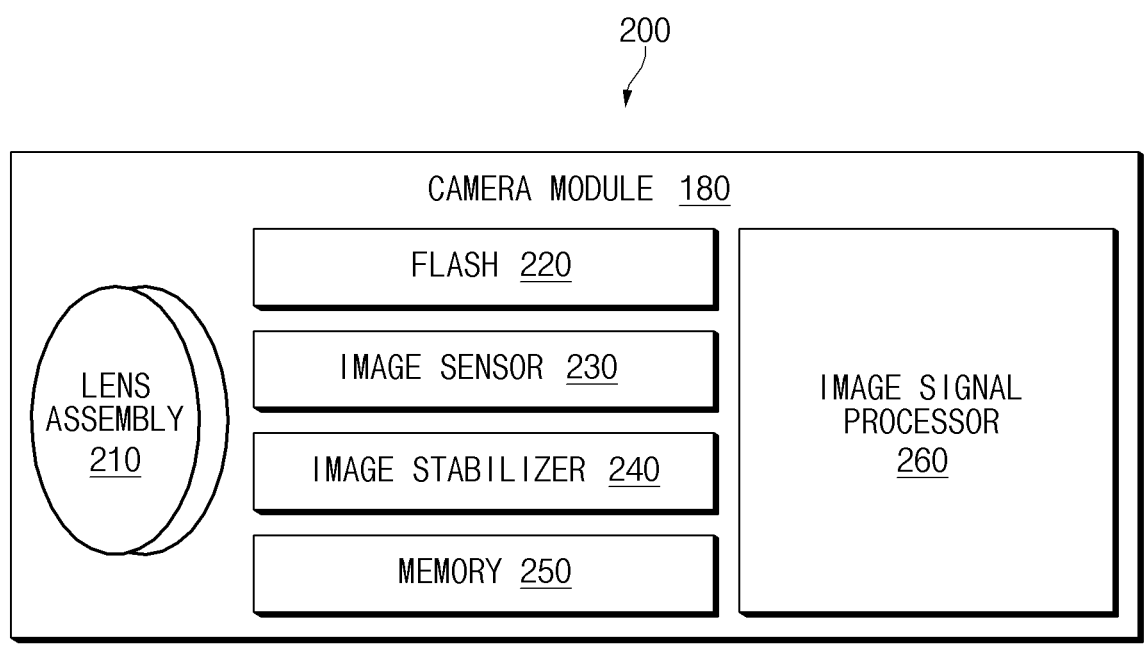
FIG. 2 is a block diagram illustrating a camera module according to an embodiment of the disclosure.

FIG. 2 is a block diagram 200 illustrating the camera module 180 according to an embodiment of the disclosure.

Referring to FIG. 2, the camera module 180 may include a lens assembly 210 (e.g., including a lens 431 and a lens barrel 432 of FIG. 5B), a flash 220, an image sensor 230 (e.g., an image sensor 419 of FIG. 13), an image stabilizer 240, a memory 250 (e.g., a buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
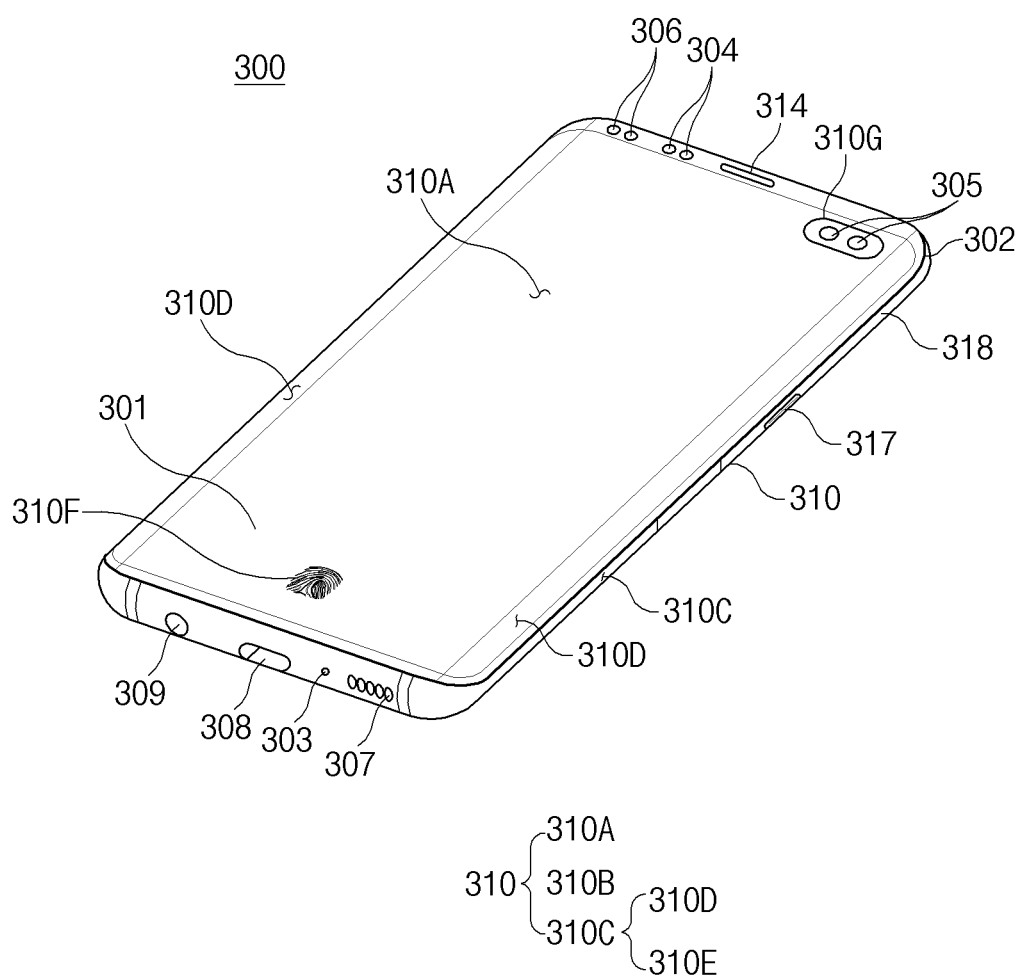
FIG. 3A is a front perspective view illustrating an electronic device according to an embodiment of the disclosure.
Figure 3B:
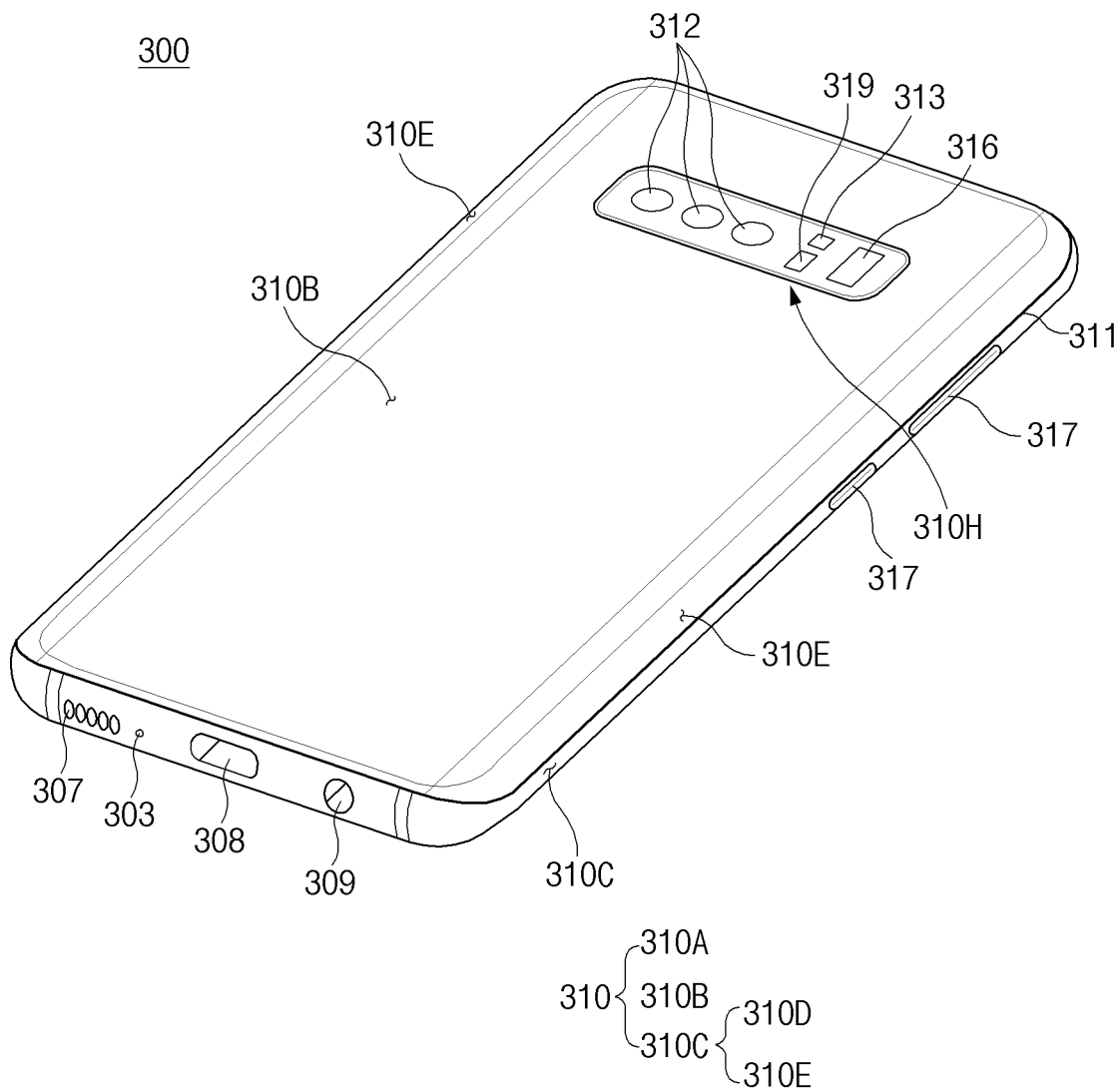
FIG. 3B is a rear perspective view illustrating the electronic device according to an embodiment of the disclosure.
Figure 3C:
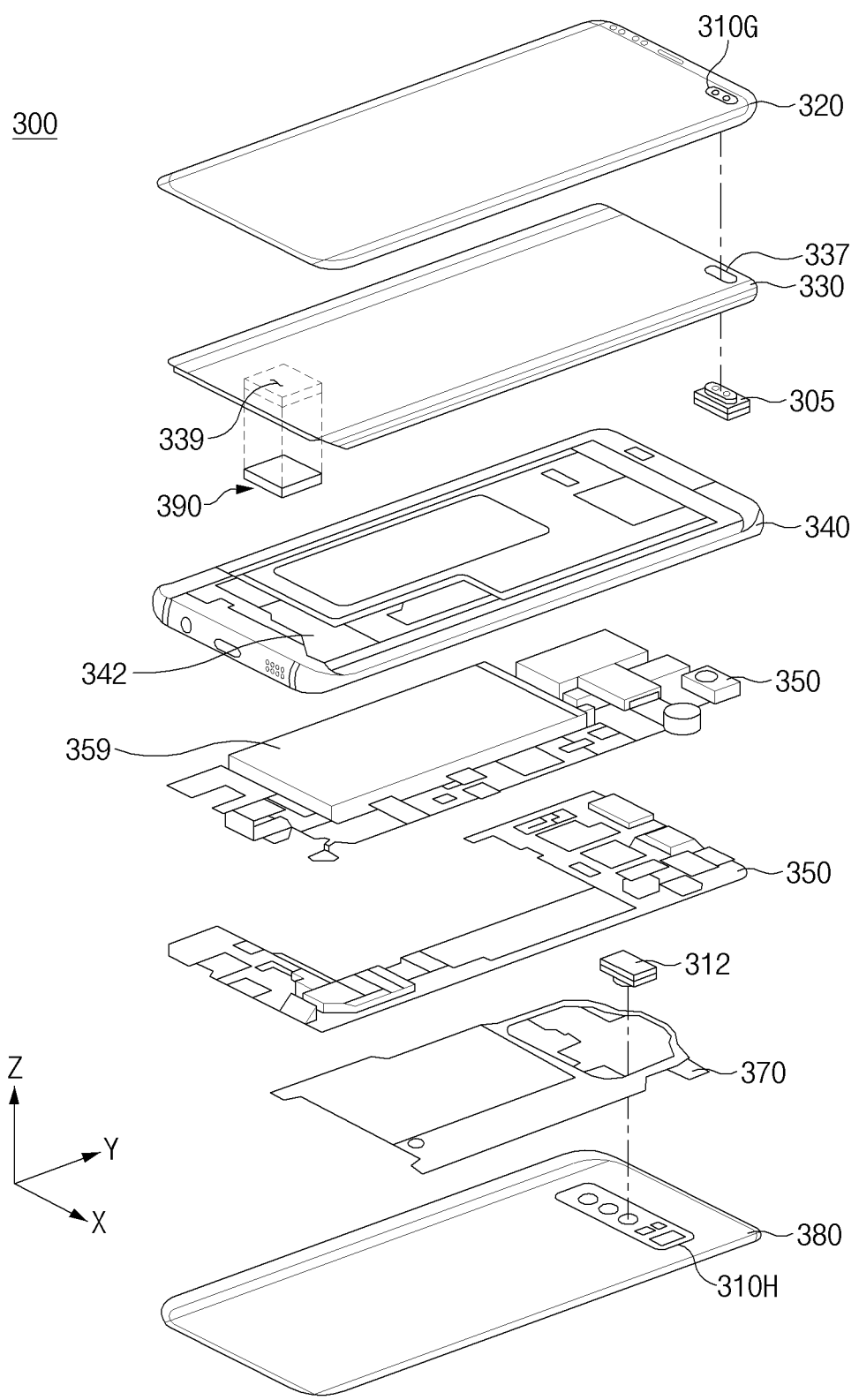
FIG. 3C is an exploded perspective view of the electronic device according to an embodiment of the disclosure.

FIG. 3A is a front perspective view illustrating an electronic device according to an embodiment of the disclosure. FIG. 3B is a rear perspective view illustrating the electronic device according to an embodiment of the disclosure. FIG. 3C is an exploded perspective view of the electronic device according to an embodiment of the disclosure.

Referring to FIGS. 3A and 3B, an electronic device 300 according to an embodiment includes a housing 310 having a first surface (or front surface) 310A, a second surface (or rear surface) 310B, and a side surface 310C surrounding a space defined between the first surface 310A and the second surface 310B.

In another embodiment (not shown), the housing 310 may refer to a structure defining some of the first surface 310A, the second surface 310B, and the side surfaces 310C.

According to an embodiment, at least a portion of the first surface 310A may be defined by a substantially transparent front plate 302 (e.g., a glass plate including various coating layers, or a polymer plate). The second surface 310B may be defined by a substantially opaque rear plate (or back plate) 311. The back plate 311 may be defined by, for example, applied or colored glass, ceramic, a polymer, metal (e.g., aluminum, stainless steel (STS), or magnesium), or a combination of at least two of the above materials. The side surface 310C may be coupled to the front plate 302 and the rear plate 311 and may be defined by a side bezel structure (or "frame structure") 318 including metal and/or a polymer.

In some embodiments, the back plate 311 and the side bezel structure 318 may be integrated with each other and include the same material (e.g., a metal material such as aluminum).

In the illustrated embodiment, the front plate 302 may include two first areas 310D, which are curved toward the rear plate 311 from the first surface 310A and extend seamlessly, on both ends of each of long edges of the front plate 302.

In the illustrated embodiment, the rear plate 311 includes two second areas 310E, which are curved toward the front plate 302 from the second surface 310B and extend seamlessly, on both ends of each of long edges of the rear plate 311.

In some embodiments, the front plate 302 (or the rear plate 311) may include only one of the first areas 310D (or the second areas 310E). In another embodiment, the front plate 302 (or the rear plate 311) may not include a portion of the first areas 310D (or the second areas 310E).

In the above embodiments, when viewed from a side of the electronic device 300, the side bezel structure 318 may have a first thickness (or a width) at a side (e.g., a short side) that belongs to the first areas 310D or the second areas 310E as described above and a second thickness less than the first thickness at a side (e.g., a long side) that is included in the first areas 310D or the second areas 310E.

According to an embodiment, the electronic device 300 may include at least one or more of a display 301, audio modules 303, 307, and 314 (e.g., the audio module 170 of FIG. 1), sensor modules 304, 316, and 319 (e.g., the sensor module 176 of FIG. 1), camera modules 305 and 312 (e.g., the camera module 180 of FIG. 1), a key input device 317 (e.g., the input device 150 of FIG. 1), a light emitting element 306, and connector holes 308 and 309 (e.g., the connection terminal 178 of FIG. 1). In some embodiments, in the electronic device 300, at least one (e.g., the key input device 317 or the light emitting element 306) of the components may be omitted, or other components may be added.

The display 301 may be exposed, for example, through a corresponding portion of the front plate 302. In some embodiments, at least a portion of the display 301 may be exposed through the front plate 302 including the first surface 310A and the first areas 310D of the side surface 310C.

In some embodiments, an edge of the display 301 may have substantially the same shape as an adjacent outer shape of the front plate 302. In another embodiment (not shown), in order to expand the area to which the display 301 is exposed, a distance between an outer portion of the display 301 and an outer portion of the front plate 302 may be substantially uniform.

In an embodiment, a surface of the housing 310 (or the front plate 302) may include a screen display area defined as the display 301 is visually exposed. For example, the screen display area may include the first surface 310A and the first areas 310D of the side surface.

In an embodiment, the screen display areas 310A and 310D may include a sensing area 310F configured to acquire biometric information of a user. Here, it may be understood as the meaning of "the screen display areas 310A and 310D include the sensing area 310F" means that at least a portion of the sensing area 310A overlaps the screen display areas 310A and 310D. For example, the sensing area 310F may mean an area that is capable of displaying visual information through the display 301, like other areas of the screen display areas 310A and 310D and is capable of additionally acquiring the user's biometric information (e.g., a fingerprint).

In an embodiment, the screen display areas 310A and 310D of the display 301 may include an area 310G to which the first camera module 305 (e.g., a punch hole camera) is visually exposed. For example, at least a portion of an edge of the area 310G to which the first camera module 305 is exposed may be surrounded by the screen display areas 310A and 310D. In various embodiments, the first camera module 305 may include a plurality of camera modules (e.g., the camera module 180 of FIG. 1).

In another embodiment (not shown), a recess or opening is defined in a portion of the screen display areas 310A and 310D of the display 301, and at least one or more of the audio module 314, the first sensor module 304, and the light emitting element 306, which are aligned with the recess or opening, may be disposed on the portion of the screen display areas 310A and 310D.

In another embodiment (not shown), at least one or more of the audio module 314, the sensor modules 304, 316, and 319, and the light emitting element 306 may be disposed on rear surfaces of the screen display areas 310A and 310D of the display 301.

In another embodiment (not shown), the display 301 may be coupled to or disposed adjacent to a touch sensing circuit, a pressure sensor that is capable of measuring an intensity (pressure) of touch, and/or a digitizer that detects a magnetic field-type stylus pen.

In some embodiments, at least a portion of the sensor modules 304, 316, and 319 and/or at least a portion of the key input device 317 may be disposed on the side surface 310C (e.g., the first areas 310D and/or the second areas 310E).

The audio modules 303, 307, and 314 may include a microphone hole 303 and speaker holes 307 and 314. A microphone for acquiring external sound may be disposed inside the microphone hole 303, and in some embodiments, a plurality of microphones may be disposed inside the microphone hole 303 in order to sense a direction of the sound. The speaker holes 307 and 314 may include an external speaker hole 307 and a call receiver hole 314. In some embodiments, the speaker holes 307 and 314 and the microphone hole 303 may be implemented as a single hole, or a speaker may be provided without the speaker holes 307 and 314 (e.g., a piezo speaker).

The sensor modules 304, 316, and 319 may generate electrical signals or data values corresponding to an internal operating state of the electronic device 300 or an external environmental state. For example, the sensor modules 304, 316, and 319 may include a first sensor module 304 (e.g., a proximity sensor) disposed on the first surface 310A of the housing 310, a second sensor module 316 (e.g., the TOF camera module) disposed on the second surface 310B of the housing 310, a third sensor module 319 (e.g., an HRM sensor) disposed on the second surface 310B of the housing 310, and/or a fourth sensor module 390 (e.g., a fingerprint sensor) coupled to the display 301.

In various embodiments, the second sensor module 316 may include the TOF camera module for measuring a distance.

In various embodiments, at least a portion of the fourth sensor module 390 may be disposed under the screen display areas 310A and 310D. For example, the fourth sensor module may be disposed in a recess 339 defined in the rear surface of the display 301. For example, the fourth sensor module 390 is not exposed to the screen display areas 310A and 310D, and a sensing area 310F may be defined on at least a portion of the screen display areas 310A and 310D.

In some embodiments (not shown), the fingerprint sensor may be disposed on the second surface 310B as well as the first surface 310A (e.g., the screen display areas 310A and 310D) of the housing 310.

In various embodiments, the electronic device 300 may further include sensor modules that are not shown, for example, a gesture sensor, a gyro sensor, an atmospheric pressure sensor, a magnetic sensor, an acceleration sensor, a grip sensor, a color sensor, an IR (infrared) sensor, a biosensor, a temperature sensor, a humidity sensor, and an illuminance sensor.

The camera modules 305 and 312 may include a first camera module 305 (e.g., the punch hole camera module) exposed to the first surface 310A of the electronic device 300 and a second camera module 312 and/or a flash 313 exposed to the second surface 310B.

In an embodiment, the first camera module 305 may be exposed through a portion of the screen display area 310D of the first surface 310A. For example, the first camera module 305 may be exposed to a partial area of the screen display area 310D through an opening (not shown) defined in a portion of the display 301.

In an embodiment, the second camera module 312 may include a plurality of camera modules (e.g., a dual camera or a triple camera). However, the second camera module 312 is not necessarily limited as including the plurality of camera modules and thus may include one camera module.

The camera modules 305 and 312 may include one or more lenses, an image sensor, and/or an image signal processor. The flash 313 may include, for example, a light emitting diode or a xenon lamp. In some embodiments, two or more lenses (the infrared camera, the wide-angle lens, and the telephoto lens) and image sensors may be disposed on one surface of the electronic device 300.

The key input device 317 may be disposed on the side surface 310C of the housing 310. In another embodiment, the electronic device 300 may not include some or all of the above-described key input devices 317, and the key input device 317 that is not included may be implemented in a different form on the display 301, like a soft key. In some embodiments, the key input device may include a fourth sensor module 390 that defines the sensing area 310F included in the screen display areas 310A and 310D.

The light emitting element 306 may be disposed, for example, on the first surface 310A of the housing 310. The light emitting element 306 may provide, for example, state information of the electronic device 300 in the form of light. In another embodiment, the light emitting element 306 may provide, for example, a light source that is interlocked with an operation of the first camera module 305. The light emitting element 306 may include, for example, an LED, an IR LED, and/or a xenon lamp.

The connector holes 308 and 309 may include a first connector hole 308 that is capable of accommodating a connector (e.g., an USB connector) for transmitting and receiving power and/or data to and from an external electronic device and/or a second connector hole 309 (e.g., an earphone jack) that is capable of accommodating a connector for transmitting and receiving audio signal to and from the external electronic device.

Referring to FIG. 3C, the electronic device 300 may include a front plate (or first plate) 320 (e.g., the front surface 310A and the first area 310D of FIG. 3A), a display 330 (e.g., the display 301 of FIG. 3A), a bracket 340 (e.g., a portion of the side surface of FIG. 3A), a first support member 342 (e.g., the plate structure), at least one printed circuit board 350, a battery 359, a rear case (or plate) 380, an antenna 370, and a rear plate 380 (e.g., the rear surface 310B and the second area 310E of FIG. 3A).

In some embodiments, at least one (e.g., the first support member 342 or the rear case 380) of the components may be omitted, or other components may be added. At least one of the components of the electronic device 300 may be the same as or similar to at least one of the components of the electronic device 300 of FIG. 3A or 3B, and thus, duplicated descriptions thereof will be omitted below.

The first support member 342 may be disposed inside the electronic device 300 in order to be connected to the bracket 340 or may be integrated with the bracket 340. The first support member 342 may be made of, for example, a metal material and/or a non-metal (e.g., polymer) material. In an embodiment, the first support member 342 may have one surface to which the display 330 is coupled and the other surface to which the printed circuit board 350 is coupled. A processor, a memory, and/or an interface may be mounted on the printed circuit board 350. The processor may include, for example, one or more of a central processing unit, an application processor, a graphic processing unit, an image signal processor, a sensor hub processor, or a communication processor.

The memory may include, for example, a volatile memory or a nonvolatile memory.

The interface may include, for example, a high definition multimedia interface (HDMI), a universal serial bus (USB) interface, an SD card interface, and/or an audio interface. The interface may, for example, electrically or physically connect the electronic device 300 to the external electronic device and may include a USB connector, an SD card/MMC connector, or an audio connector.

The battery 359 may be a device for supplying power to at least one component of the electronic device and may include, for example, a non-rechargeable primary cell, a rechargeable secondary cell, or a fuel cell. At least a portion of the battery 359 may be disposed, for example, on substantially the same plane as the printed circuit board 350. The battery 359 may be integrally disposed inside the electronic device 300 or may be disposed to be detachable from the electronic device 300.

The antenna 370 may be disposed between the rear plate 380 and the battery 359. The antenna 370 may include, for example, a near field communication (NFC) antenna, a wireless charging antenna, and/or a magnetic secure transmission (MST) antenna. The antenna 370 may perform, for example, short-range communication with the external device or may wirelessly transmit/receive power required for charging. In another embodiment, an antenna structure may be provided by a portion of the bracket 340 and/or the first support member 342 or a combination thereof.

In various embodiments, the camera module 305 may be disposed inside the housing 310 so that the lens is exposed to the camera area 310G of the front surface 310A of the electronic device 300. For example, the camera area 310G may be defined on the first plate 320. For example, the camera module 305 may include a hole defined in the rear surface of the display 330 or a punch hole camera disposed inside a recess 337.

In various embodiments, the camera module 312 may be disposed inside the housing 310 so that the lens is exposed to a camera area 310H of the rear surface 310B of the electronic device 300. For example, the camera module 312 may be disposed on the printed circuit board 350.

Figure 4:
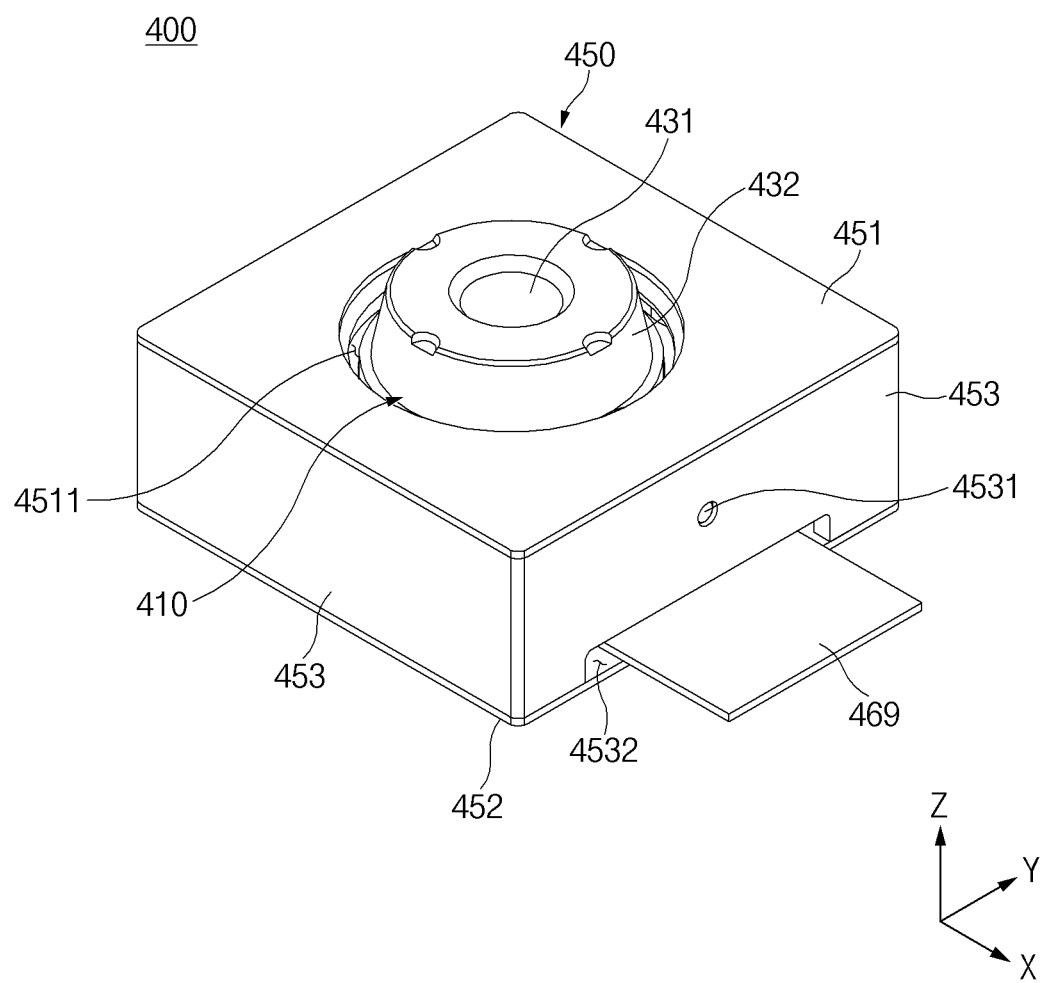
FIG. 4 is a perspective view of a camera module according to an embodiment of the disclosure.

FIG. 4 is a perspective view of a camera module according to an embodiment of the disclosure.

Referring to FIG. 4, in an embodiment, a camera module 400 (e.g., the camera module 180 of FIG. 2 and the camera modules 305 and 312 of FIGS. 3A, 3B, and 3C) may include a camera assembly 410 and a second camera housing 450 in which the camera assembly 410 is disposed. In various embodiments, the second camera housing 450 may be a structure included in an electronic device (e.g., the electronic device 300 of FIGS. 3A, 3B, and 3C).

In an embodiment, the second camera housing 450 may include a first surface 451 to which a lens 431 is exposed, a second surface 452 facing the first surface 451 in a −Z-axis direction, and a side surface 453 surrounding a space between the first surface 451 and the second surface 452. For example, the side surface 453 may define a surface extending in an X-axis and/or a Y-axis direction. In an embodiment, a first opening 4511 in which at least a portion of the lens 431 is disposed may be defined in the first surface 451. In an embodiment, a second opening (or hole) 4531 and/or a third opening (or hole) 4352 may be defined in the side surface 453. For example, an extension portion 469 extending outward from a PCB (e.g., a PCB 460 in FIGS. 5A and 5B) disposed inside the second camera housing 450 may be disposed in the third opening 4352. For example, the extension portion 469 may include a flexible printed circuit board (FPCB). For example, the extension portion 469 may extend to a substrate on which a processor (e.g., the processor 120 of FIG. 1) of an electronic device (e.g., the electronic device 101 of FIG. 1) is disposed.

In an embodiment, at least a portion of the camera assembly 410 may be disposed inside the second camera housing 450. For example, a portion of the camera assembly 410 may be visually recognized from the outside through the first opening 4511 defined in the first surface 451 of the second camera housing 450. In an embodiment, the camera assembly 410 may include a lens barrel 432 including at least one lens 431. The lens barrel 432 may have, for example, one or more lenses 431 disposed therein. The lens barrel 432 may be provided to surround the one or more lenses 431.

In an embodiment, at least a portion of the lens barrel 432 may be disposed to protrude from the first surface 451 of the second camera housing 450 through the first opening 4511 defined in the first surface 451 of the second camera housing 450. For example, the lens barrel 432 may be aligned with the first opening 4511. In an embodiment, the lens barrel 432 may move in the first opening 4511 according to a movement (e.g., moving) of the camera assembly 410. For example, the lens barrel 432 may perform movement (e.g., rotational movement or linear movement) about the X, Y, and Z-axes in the first opening 4511, and during the movement, an additional guide member (not shown) may be provided so as not to collide with the first opening 4511.

Figure 5A:
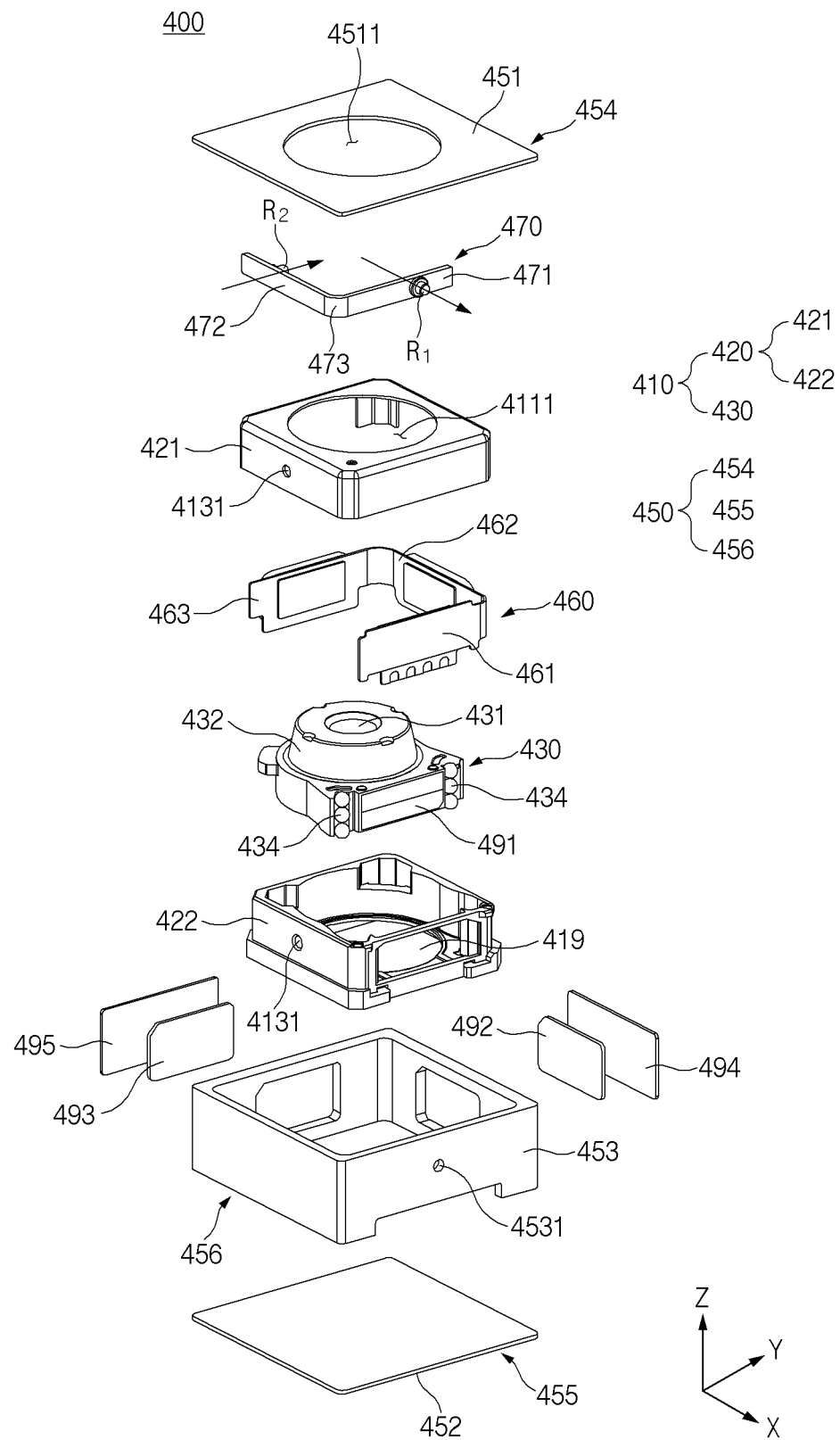
FIGS. 5A and 5B are exploded perspective views of the camera module according to various embodiments of the disclosure.
Figure 5B:
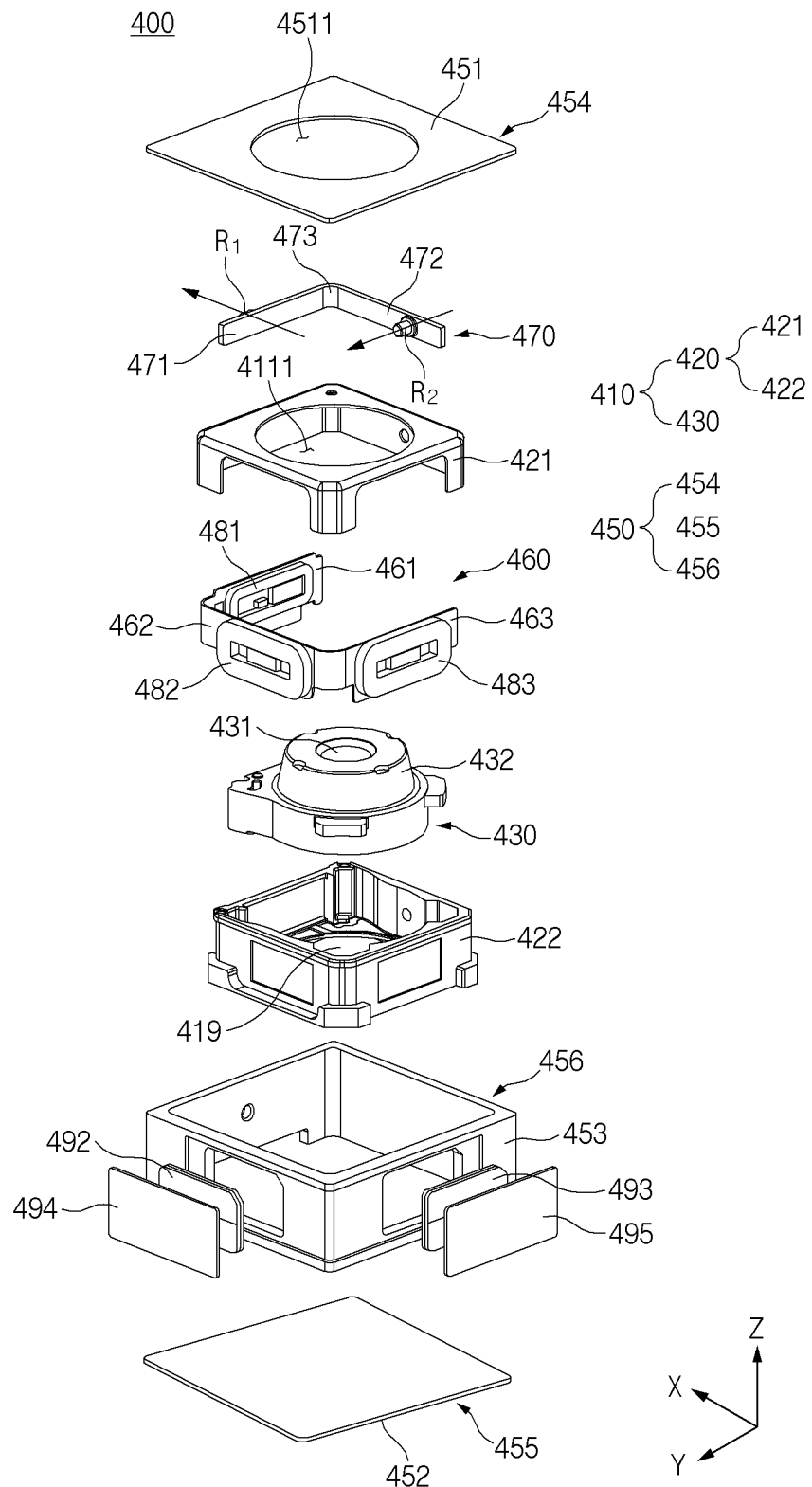

FIGS. 5A and 5B, are exploded perspective views of the camera module according to various embodiments of the disclosure.

Referring to FIGS. 5A and 5B, in an embodiment, the camera module 400 may include the second camera housing 450, the camera assembly 410, a PCB 460, and/or a connection member 470.

In an embodiment, the second camera housing 450 may include the first surface 451 in which the first opening is defined, a second surface 452 facing the first surface 451 in a −Z-axis direction, and/or a side surface 453 surrounding a space between the first surface 451 and the second surface 452. In an embodiment, the lens 431 may receive external light through the first opening 4511.

In various embodiments, the second camera housing 450 may include a cover 454 defining the first surface 451, a side member 456 defining the side surface 453, and/or a base 455 defining the second surface 452. The cover 454, the base 455, and the side member 456 may define an inner space in which at least a portion of the camera assembly 410 and the PCB 460 are disposed. The side member 456 may define at least a portion of the side surface of the camera module 400. For example, the side members 456 may define side surfaces facing a direction that is perpendicular to the optical axis (e.g., the Z-axis) of the lens 431 (e.g., the X-axis and the Y-axis). A second magnetic body 492 and a third magnetic body 493 may be disposed on at least two side surfaces that are adjacent to each other According to an embodiment, the position of the second magnetic body 492 or the third magnetic body 493 is not limited to the illustrated embodiment. In various embodiments, the position, size, or number of the second magnetic body 492 or the third magnetic body 493 may be changed. For example, the second magnetic body 492 may be disposed on a first side surface and/or a third side surface, which face each other, among the side surfaces, and the second magnetic body 492 may be disposed on a second side surface defined between the first side surface and the third side surface.

In an embodiment, the camera assembly 410 may include the first camera housing 420, a lens carrier 430, the image sensor (e.g., the image sensor 230 of FIG. 2 and an image sensor 419 of FIG. 13) and/or the PCB 460. The first camera housing 420 may include, for example, an upper frame 421 or a lower frame 422. For example, the upper frame 421 may be coupled to the lower frame 422 to define a space in which the lens carrier 430 is disposed. For example, an opening 4111 through which a portion of the lens barrel 432 included in the lens carrier 430 is exposed may be defined in the upper frame 421. In an embodiment, the upper frame 421 may be provided as a shield can in order to shield electromagnetic waves. The opening 4111 may be aligned with, for example, the first opening 4511 of the second camera housing 450. The upper frame 421 may define, for example, at least some of the side surfaces of the camera assembly 410 together with the lower frame 422. In an embodiment, the PCB 460 may surround at least a portion of the camera assembly 410. The PCB 460 may include, for example, a flexible printed circuit board (FPCB).

In an embodiment, the PCB 460 may include a first coil disposed on the first area, a second coil 482 disposed on the second area 462, and a third coil 483 disposed on the third area 463.

In an embodiment, the first area 461 may face an extension direction (e.g., a Y-axis direction) of the first rotation shaft R1. The second area 462 may face an extension direction (e.g., an X-axis direction) of the second rotation shaft R2. The first area 461 and the second area 462 may be areas adjacent to each other. The third area 463 may be, for example, defined to face either the first area 461 or the second area 462.

In an embodiment, the lens carrier 430 may include the lens barrel 432. The lens barrel 432 may include at least one lens 431 therein. The lens carrier 430 may include a third magnetic body 493 and/or a plurality of balls 434, which are disposed on the side surfaces. The lens carrier 430 may be disposed in a space defined by the upper frame 421 and the lower frame 422. The lens carrier 430 may be disposed so that the third magnetic body 493 faces the third area 463 of the PCB 460.

In an embodiment, the connection member 470 may include a first portion 471 at which the first rotation shaft R1 is disposed and a second portion 472 at which the second rotation shaft R2 extending to be perpendicular to the first rotation shaft R1 is disposed. The connection member 470 may be disposed between the second camera housing 450 and the camera assembly 410.

In an embodiment, the first portion 471 of the connection member 470 may be disposed between the first area 461 of the PCB 460 and the second camera housing 450. The second portion 472 of the connection member 470 may be disposed between one surface of the camera assembly 410, which is not surrounded by the PCB 460, and the second camera housing 450.

In an embodiment, the connection member 470 may include a corner portion 473 defined between the first portion 471 and the second portion 472. The corner portion 473 may include a curved surface. Alternatively, the corner portion 473 may include a plane facing a direction different from a direction in which the plane of the first portion 471 and the plane of the second portion 472 are directed.

In an embodiment, the camera assembly 410 may rotate about the first rotation shaft R1 (e.g., the X-axis) together with the connection member 470. For example, the second camera housing 450 may be fixed, and the first rotation shaft R1 may be inserted into a first hole 4531 defined in the side surface of the second camera housing 450 in order to support rotation of the camera assembly 410 and the connection member 470.

In an embodiment, the camera assembly 410 may rotate about the second rotation shaft R2 (e.g., the Y-axis). For example, the connection member 470 and the second camera housing 450 may be fixed, and the camera assembly 410 may rotate relative to the connection member 470 and the second camera housing 450. The second rotation shaft R2 may be inserted into a second hole 4131 defined in the side surface of the camera assembly 410 in order to support the rotation of the camera assembly 410.

In an embodiment, the camera module 400 may further include a first yoke 494 or a second yoke 495 disposed on the side surface of the second camera housing 450. When viewed in the Y-axis direction, the first yoke 494 may be disposed to overlap the second magnetic body 492. When viewed in the −X-axis direction, the second yoke 495 may be disposed to overlap the third magnetic body 493. The first yoke 494 or the second yoke 495 may be made of a ferromagnetic substance. The first yoke 494 or the second yoke 495 may be disposed on the side surface of the second camera housing 450 so that magnetic fields generated by the second magnetic body 492 and the third magnetic body 493 does not affect components disposed outside the camera module 400. For example, at least a portion of the magnetic fields may be shielded by the first yoke 494 or the second yoke 495.

Figure 6A:
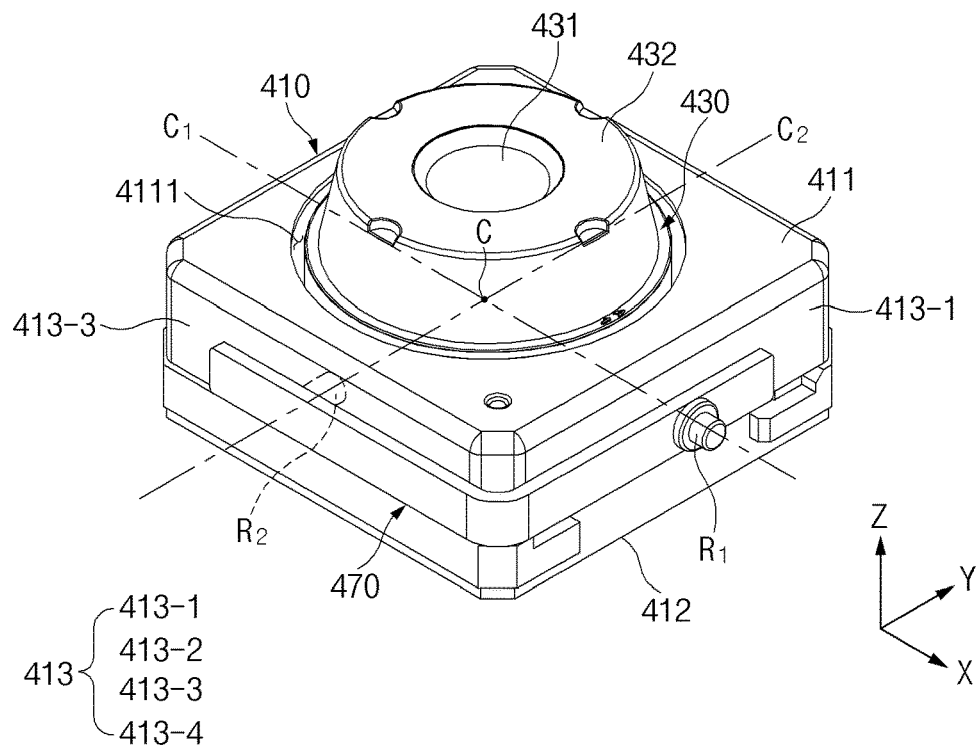
FIGS. 6A and 6B are views illustrating the camera assembly and the connection member of the camera module according to an embodiment of the disclosure.
Figure 6B:
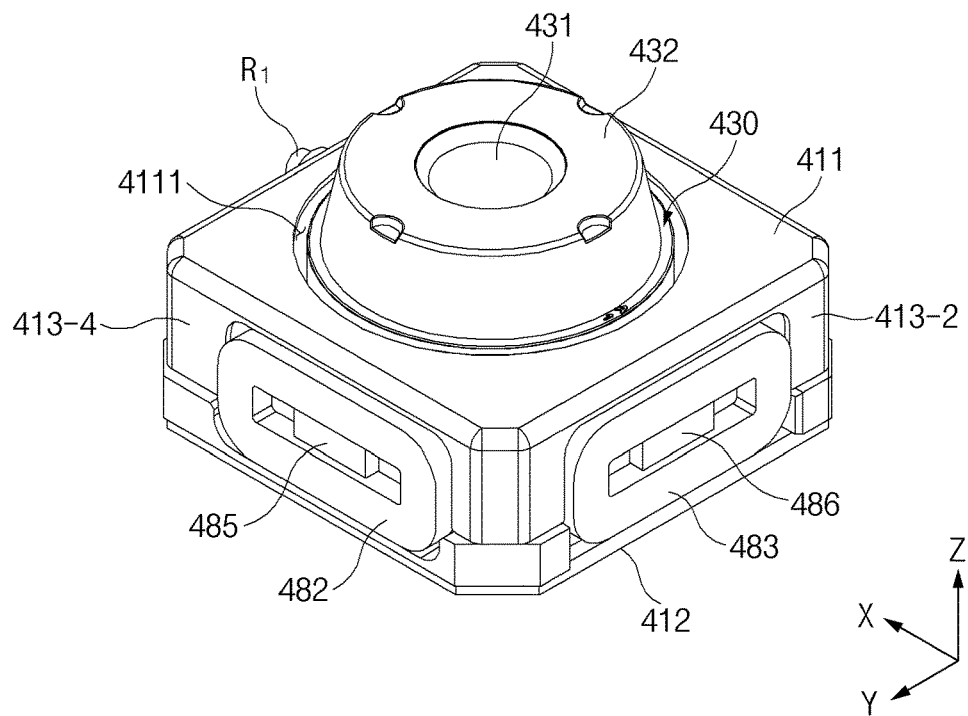

FIGS. 6A and 6B are views illustrating the camera assembly and the connection member of the camera module according to an embodiment of the disclosure.

Referring now to FIGS. 6A and 6B, in an embodiment, the connection member 470 may include a first rotation shaft R1 and a second rotation shaft R2, which are perpendicular to each other. For example, the first rotation shaft R1 may extend in the X-axis direction, and the second rotation shaft R2 may extend in the Y-axis direction. In an embodiment, the connection member 470 may be coupled to a first side surface 413-1 of the camera assembly 410 and a third side surface 413-3 adjacent to the first side surface 413-1.

In an embodiment, the camera assembly 410 may include a top surface 411 to which the lens 431 is exposed, a bottom surface 412 facing the top surface 411, and a side surface defined between the top surface 411 and the bottom surface 412. For example, an opening 4111 through which the lens 431 and/or the lens barrier 432 are exposed may be defined in the top surface 411. In various embodiments, at least a portion of the lens carrier 430 may be disposed inside the camera assembly 410, and a remaining portion of the lens carrier 430 may be disposed to protrude from the top surface 411 through the opening 4111.

In an embodiment, the side surface 413 may include a first side surface 413-1, a second side surface 413-2 facing the first side surface 413-1, a third side surface 413-3 connecting the first side surface 413-1 to the second side surface 413-2, and a fourth side surface facing the third side surface 413-3. For example, the first side surface 413-1 and the second side surface 413-2 may face the extension direction of the first rotation shaft R1. The third side surface 413-3 and the fourth side surface 413-4 may face the extension direction of the second rotation shaft R2.

In an embodiment, the first portion 471 of the connection member 470 may be coupled to the first side surface 413-1. In an embodiment, the second portion 472 of the connection member 470 may be coupled to the third side surface 413-3. For example, a second hole 4131 of FIG. 5A may be defined in the third side surface 413-3, and the third side surface 413-3 may be coupled to the connection member 470 through the second hole 4131.

In various embodiments, a portion of the connection member 470 may be coupled to at least one of the side surfaces 413 facing the direction of the first rotation shaft R1. In the illustrated embodiment, the first portion 471 of the connection member 470 may be coupled the first side surface 413-1. In various embodiments, a portion of the connection member 470 may be coupled to at least one of the side surfaces facing the direction of the second rotation shaft R2. In the illustrated embodiment, the second portion 472 of the connection member 470 may be coupled to the third side surface 413-3.

However, the coupling relationship between the connection member 470 and the camera assembly 410 is not limited as illustrated in the drawings. For example, the connection member 470 may be disposed over adjacent side surfaces of the side surfaces 413 of the camera assembly 410. For example, the first portion 471 of the connection member 470 may be coupled to the second side surface 413-2, and the second portion 472 of the connection member 470 may be coupled to the fourth side surface 413-4.

In various embodiments, at least one coil 482 and 483 may be disposed on a surface of the side surfaces 413 of the camera assembly 410, on which the connection member 470 is not disposed. For example, the third coil 483 may be disposed on the second side surface 413-2. For example, the second coil 482 may be disposed on the fourth side surface 413-4.

In an embodiment, the second coil 482 may be related to the rotation and movement of the camera assembly 410 about the first rotation shaft R1. The second coil 482 may be disposed on an area of the side surfaces 413 of the camera assembly 410, which faces a direction that is perpendicular to the first rotation shaft R1. For example, the second coil 482 may be disposed on the fourth side surface 413-4. In an embodiment, the third coil 483 may be related to the rotation of the camera assembly 410 about the second rotation shaft R2. The third coil 483 may be disposed on an area of the side surfaces 413 of the camera assembly 410, which faces a direction that is perpendicular to the second rotation shaft R2. For example, the third coil 483 may be disposed on the second side surface 413-2.

In various embodiments, the second coil 482 and the third coil 483 may be disposed on an area which faces the second portion 472 of the connection member 470. The third coil 483 may be disposed on an area facing the first portion 471 of the connection member 470. However, the positions of the second coil 482 and the third coil 483 are not limited as illustrated in the drawings. For example, the second coil 482 may be disposed on the third side surface 413-3 together with the connection member 470. Alternatively, the third coil 483 may be disposed on the first side surface 413-1 together with the connection member 470.

In various embodiments, the first rotation shaft R1 and the second rotation shaft R2 may be provided at substantially the same height from the bottom surface 412 of the camera assembly 410 when viewed in the direction of the optical axis of the lens 431. Accordingly, a first virtual line C1 extending from the first rotation shaft R1 and a second virtual line C2 extending from the second rotation shaft R2 may define a virtual rotation center point C disposed inside the lens carrier 430. The virtual rotation center point C may be disposed on the optical axis of the lens. In various embodiments, the camera assembly 410 may move to be rotate about the virtual rotation center point C.

In various embodiments, the camera module 400 may include a control circuit (not shown) configured to control the coils 482 and 483, a second sensor 485, and/or a third sensor 486.

In various embodiments, the control circuit may control first rotation to rotate about the first rotation shaft R1 of the camera assembly 410 based on a signal sensed from the second sensor 485. For example, the control circuit may sense the relative position of the second coil 482 with respect to the second magnetic body 492 disposed in the second camera housing 450 through the second sensor 485, and based on the sensed position, the control circuit may detect the current rotation angle of the camera assembly 410 and control current (e.g., intensity and direction) applied to the second coil 482 in order to reduce an offset between the current rotation angle and a target rotation angle.

In various embodiments, the control circuit may control second rotation of the camera assembly 410 about the second rotation shaft R2 based on a signal sensed from the third sensor 486. For example, the control circuit may sense the relative position of the third coil 483 with respect to the third magnetic body 493 disposed in the third camera housing 450 through the third sensor 486, and based on the sensed position, the control circuit may detect the current rotation angle of the camera assembly 410 and control current (e.g., intensity and direction) applied to the third coil 483 in order to reduce an offset between the current rotation angle and a target rotation angle.

In various embodiments, each of the second sensor 485 and the third sensor 486 may include a gyro sensor and/or an acceleration sensor. For example, the control circuit (e.g., the processor 120 of FIG. 1) may detect shaking applied to the camera module 400 or the electronic device (e.g., the electronic device 101 of FIG. 1) based on information acquired from the second sensor 485 and the third sensor 486 and generate a control signal based on an intensity and direction of the shaking and then transmit the control signal to each coil or the driving circuit.

Figure 7A:
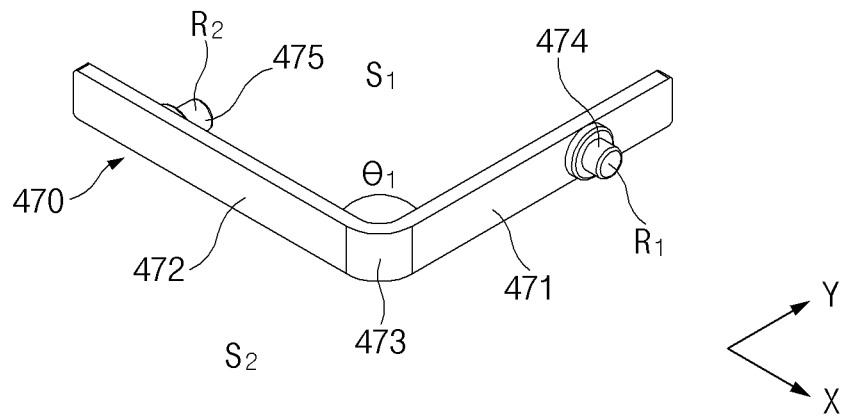
FIGS. 7A and 7B are views illustrating the connection member of the camera module according to various embodiments of the disclosure.
Figure 7B:
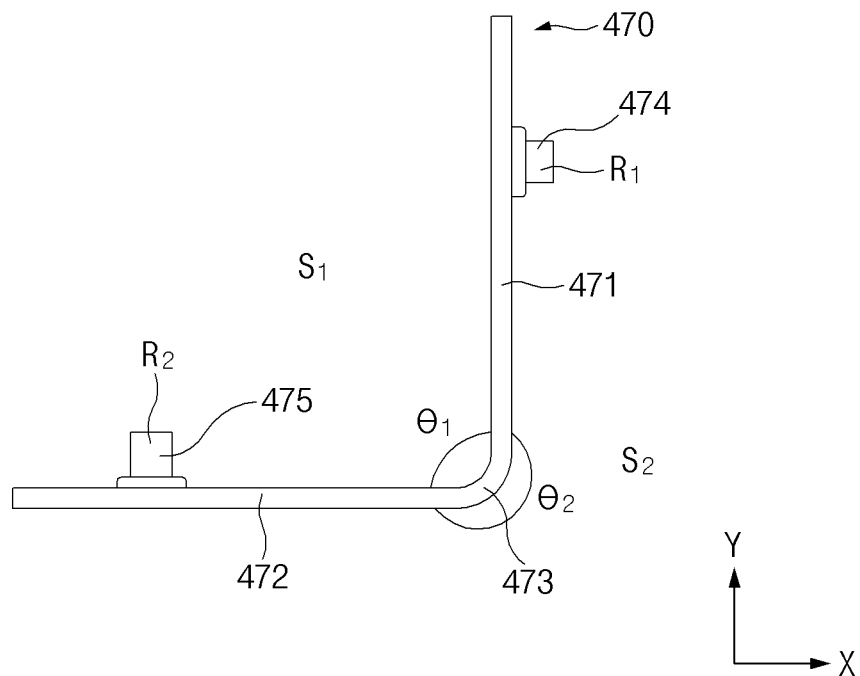

FIGS. 7A and 7B are views illustrating the connection member of the camera module according to various embodiments of the disclosure.

Referring to FIG. 7A, it is a perspective view of the connection member, and referring to FIG. 7B, it is a plan view of the connection member.

In an embodiment, the connection member 470 may include a first portion 471 at which the first rotation shaft R1 is disposed and a second portion 472 at which the second rotation shaft R2 is disposed. The first portion 471 may include a plane facing the same direction as the extension direction of the first rotation shaft R1. The second portion 472 may include a plane facing the same direction as the extension direction of the second rotation shaft R2.

In various embodiments, the connection member 470 may include a corner portion 473 defined between the first portion 471 and the second portion 472. For example, the corner portion 473 may include a curved surface. As another example, the corner portion 473 may include a surface facing a direction different from a direction in which the plane of the first portion 471 and the plane of the second portion 472 are directed.

Figure 9:
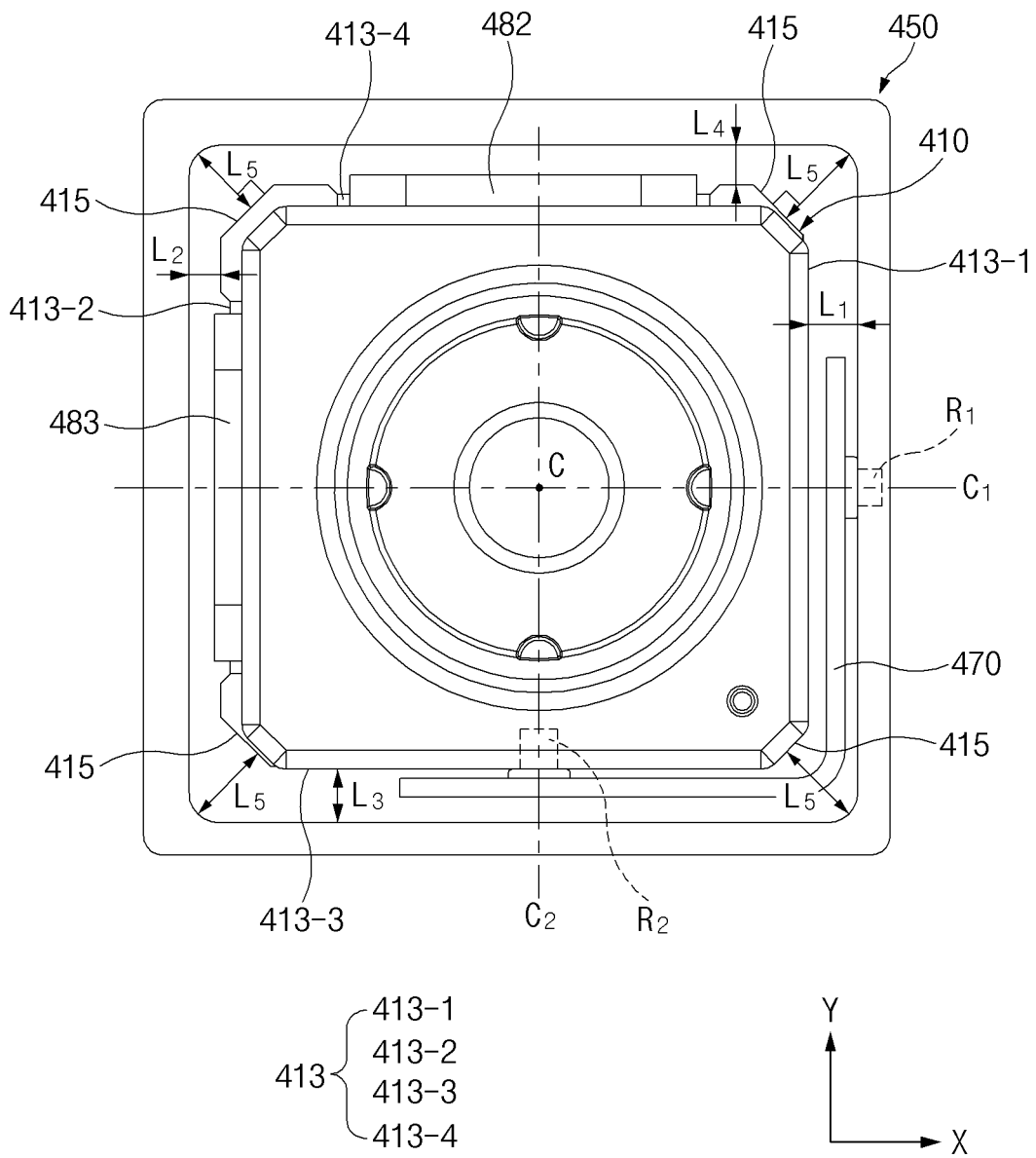
FIG. 9 is a plan view illustrating the camera module according to an embodiment of the disclosure.

In various embodiments, in the connection member 470, a corner portion 473 may be in contact with a corner area (e.g., the corner area 415 of FIG. 9) of the camera assembly (e.g., the camera assembly 410 of FIG. 9) or may be disposed to be spaced a predetermined gap from a corner area (e.g., the corner area 415 of FIG. 9) of the camera assembly (e.g., the camera assembly 410 of FIG. 9).

In various embodiments, the first rotation shaft R1 may protrude from the first portion 471 of the connection member 470. For example, the first rotation shaft R1 may protrude in a +X-axis direction. The second rotation shaft R2 may protrude from the second portion 472 of the connection member 470. For example, the second rotation shaft R2 may protrude in a +Y-axis direction.

In various embodiments, the connection member 470 may include a first protrusion 474 protruding from the first portion 471 and providing the first rotation shaft R1 and a second protrusion 475 protruding from the second portion 472 and providing the second rotation shaft R2.

In various embodiments, an inner region S1 in which the first portion 471 and the second portion 472 have a relatively small angle $\theta 1$ (e.g., less than 180 degrees) and an outer region S2 in which the first portion 471 and the second portion 472 have a relatively large angle $\theta 2$ (e.g., greater than 180 degrees) may be defined. In this case, the first rotation shaft R1 may protrude to the outer region S2, and the second rotation shaft R2 may protrude to the inner region S1. For example, the first rotation shaft R1 may be coupled to be accommodated in the first hole 4531 of the second camera housing 450. As another example, the second rotation shaft R2 may be coupled to be accommodated in the second hole 4131 of the camera assembly 410.

In various embodiments, the shapes of the first portion 471 and the second portion 472 are not limited to the illustrated embodiment, and the first portion 471 and the second portion 472 may be changed. For example, the connection member 470 may be constituted by a plurality of first portions 471 and a plurality of second portions 472 in order to define a hinge structure (not shown) having four surfaces facing different directions. In the above embodiment, the hinge structure (not shown) may be provided in a substantially rectangular shape or cross shape.

In various embodiments, the positions of the first rotation shaft R1 and the second rotation shaft R2 may be changed. For example, the first rotation shaft R1 may protrude to the outer region S2 of the connection member 470, and the second rotation shaft R2 may protrude to the inner region S1. For another example, a third rotation shaft (not shown) may protrude to the inner region S1 at the corner portion 473, and the camera assembly (e.g., the camera assembly 410 of FIG. 6A) may rotate using the third rotation shaft (not shown).

Figure 8:
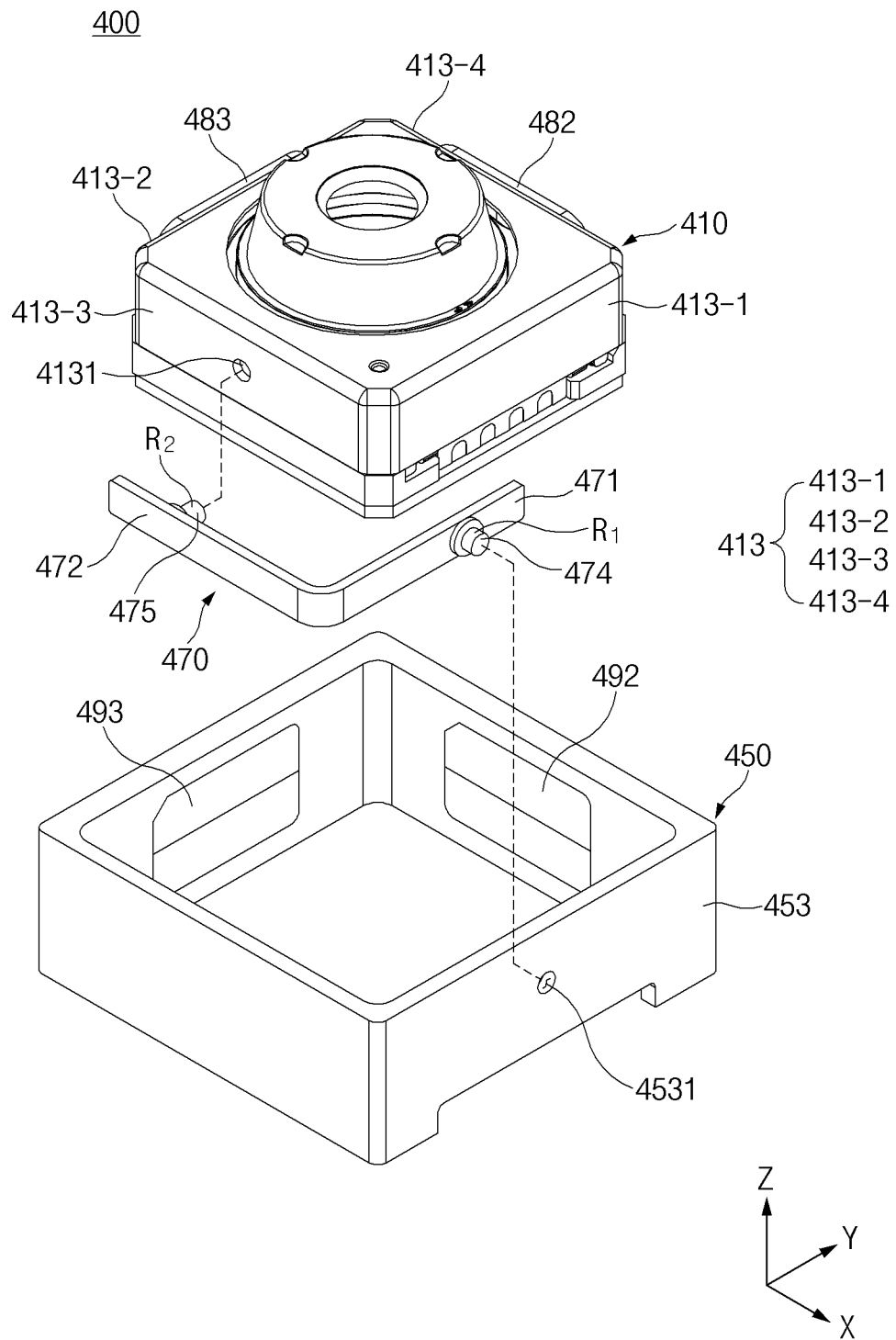
FIG. 8 is a view illustrating the camera assembly, the connection member, and a housing of the camera module according to an embodiment of the disclosure.

FIG. 8 is a view illustrating the camera assembly, the connection member, and a housing of the camera module according to an embodiment of the disclosure.

Referring to FIG. 8, in an embodiment, the connection member 470 may be disposed between the camera assembly 410 and the second camera housing 450. For example, the connection member 470 may be disposed between the side surface 413 of the camera assembly 410 and the inner surface of the second camera housing 450, which faces the side surface of the camera assembly 410.

In an embodiment, the connection member 470 may be disposed on the adjacent side surface of the camera assembly 410. For example, the connection member 470 may be coupled to the camera assembly 410 so that the first portion 471 is disposed adjacent to the first side surface 413-1 of the camera assembly 410, and the second portion 472 is disposed adjacent to the third side surface 413-3 of the camera assembly 410.

In an embodiment, the connection member 470 may be disposed between the camera assembly 410 and the second camera housing 450 so that the first rotation shaft R1 faces the second camera housing 450, and the second rotation shaft R2 faces the camera assembly 410.

In various embodiments, the first protrusion 474 of the connection member 470 may protrude from the first portion 471 in the X-axis direction. The first protrusion 474 may be accommodated in the first hole 4531 of the second camera housing 450 to provide the first rotation shaft R1.

In various embodiments, the second protrusion 475 of the connection member 470 may protrude from the second portion 472 in the Y-axis direction. The second protrusion 475 may be accommodated in the second hole 4131 of the camera assembly 410 to provide the first rotation shaft R1.

In an embodiment, the second camera housing 450 may include a first hole 4531 defined in a portion of the side surface 453. For example, the first hole 4531 may be defined in an area of the side surfaces of the second camera housing 450, which faces the first side surface 413-1 of the camera assembly 410. The first rotation shaft R1 of the connection member 470 may be accommodated in the first hole 4531. The connection member 470 may be coupled to the second camera housing 450 so that the first rotation shaft R1 extends into the first hole 4531. The first hole 4531 may support the first rotation shaft R1 when the connection member 470 rotates.

In various embodiments, the first hole 4531 may be defined in a side member (e.g., side member 456 of FIGS. 5A and 5B) defining at least a portion of the side surface 453 of the second camera housing 450.

Referring to the drawing, the first hole 4531 is illustrated to pass through the side surface 453 of the second camera housing 450, but the structure in which the first rotation shaft R1 is inserted is not limited as illustrated in the drawing. For example, the first rotation shaft R1 may be disposed on an inner surface of the second camera housing 450 and may be rotatably coupled to a groove that does not pass through the inner surface.

In an embodiment, the camera assembly 410 may include a second hole 4131 defined in the third side surface 413-3. The second rotation shaft R2 of the connection member 470 may be accommodated in the second hole 4131. The connection member 470 may be coupled to the camera assembly 410 so that the second rotation shaft R2 extends into the second hole 4131. The second rotation shaft R2 may support the camera assembly 410 if the camera assembly 410 rotates.

Referring to the drawing, the second hole 4131 is illustrated to pass through the third side surface 413-3 of the camera assembly 410, but the structure in which the second rotation shaft R2 is inserted is not just limited as illustrated in the drawing. For example, the second rotation shaft R2 may be disposed on the third side surface 413-3 of the camera assembly 410 and may be rotatably coupled to a groove that does not pass through the third side surface 413-3.

In an embodiment, the connection member 470 may be disposed between the camera assembly 410 and the second camera housing 450 so that the first rotation shaft R1 is inserted into the first hole 4531, and the second rotation shaft R2 is inserted into the second hole 4131.

In another embodiment, the first rotation shaft R1 may protrude from the inner surface of the second camera housing 450, and a hole into which the first rotation shaft R1 is rotatably inserted may be defined in the first portion 471 of the connection member 470.

In another embodiment, the second rotation shaft R2 may protrude from the third side surface 413-3 of the camera assembly 410, and a hole into which the second rotation shaft R2 is rotatably inserted may be defined in the second portion 472 of the connection member 470.

FIG. 9 is a plan view illustrating the camera module according to an embodiment of the disclosure.

Referring to FIG. 9, in an embodiment, the camera module 400 may include the second camera housing 450, the camera assembly 410 disposed inside the second camera housing 450, and/or the connection member 470 disposed between the camera assembly 410 and the second camera housing 450.

In an embodiment, the third coil 483 may be disposed on the second side surface 413-2 of the camera assembly 410, and the second coil 482 may be disposed on the fourth side surface 413-4 of the camera assembly 410.

In an embodiment, the camera assembly 410 may be rotatably disposed relative to the second camera housing 450 inside the second camera housing 450 with respect to at least two shafts (e.g., the first rotation shaft R1 and the second rotation shaft R2) that are perpendicular to each other. In various embodiments, the camera assembly 410 may be configured to enable first rotation that rotates about the first rotation shaft R1 and second rotation that rotates about the second rotation shaft R2. For example, the first rotation of the camera assembly 410 may be performed together with the connection member 470. As another example, the second rotation of the camera assembly 410 may be performed separately from the connection member 470. During the second rotation, the connection member 470 may be fixed to the second camera housing 450. The first rotation and the second rotation may be performed simultaneously or sequentially.

In various embodiments, the camera assembly 410 may be configured to enable third rotation in which the first rotation and the second rotation are simultaneously performed. For example, the third rotation may include rotation around a virtual rotation center point C defined by a first virtual line C1 from which the first rotation shaft R1 extends and a second virtual line C2 from which the second rotation shaft R2 extends.

In an embodiment, the inner surface of the second camera housing 450 and the side surface 413 of the camera assembly 410 may be spaced a predetermined gap from each other. The predetermined gap may be related to a rotation radius of the camera assembly 410. For example, if the camera assembly 410 rotates sequentially and/or simultaneously about the first rotation shaft R1 and/or the second rotation shaft R2, the side surface 413 of the camera assembly 410 or the coils 482 and 483 may collide with the inner surface of the second camera housing 450. In order to prevent this phenomenon, a predetermined space may be defined between the inner surface of the second camera housing 450 and the camera assembly 410.

In an embodiment, the camera assembly 410 may include a corner area 415 defined on the side surface 413 of the camera assembly 410. The corner area 415 may face a direction different from the direction facing the side surface 413. The corner area 415 may be defined, for example, in a substantially planar shape.

Referring to FIG. 9, the camera assembly 410 may be disposed so that the first side surface 413-1 is spaced a first distance L1 from the inner surface of the second camera housing 450 facing the first side surface 413-1. The first distance L1 may be, for example, a distance measured in the X-axis direction (e.g., the extension direction of the first rotation shaft R1) from the first side surface 413-1 up to an inner surface of the second camera housing 450. The first distance L1 may be, for example, the shortest distance between the first side surface 413-1 and the inner surface of the second camera housing 450.

Referring to FIG. 9, the camera assembly 410 may be disposed so that the second side surface 413-2 is spaced a second distance L2 from the inner surface of the second camera housing 450 facing the second side surface 413-2. The second distance L2 may be, for example, a distance measured in the −X-axis direction (e.g., the extension direction of the first rotation shaft R1) from the second side surface 413-2 up to the inner surface of the second camera housing 450. The second distance L2 may be, for example, the shortest distance between the second side surface 413-2 and the inner surface of the second camera housing 450.

Referring to FIG. 9, the camera assembly 410 may be disposed so that the third side surface 413-3 is spaced a third distance L3 from the inner surface of the second camera housing 450 facing the third side surface 413-3. The third distance L3 may be, for example, a distance measured in the Y-axis direction (e.g., the extension direction of the second rotation shaft R2) from the third side surface 413-3 up to the inner surface of the second camera housing 450. The third distance L3 may be, for example, the shortest distance between the third side surface 413-3 and the inner surface of the second camera housing 450.

Referring to FIG. 9, the camera assembly 410 may be disposed so that the fourth side surface 413-4 is spaced a fourth distance L4 from the inner surface of the second camera housing 450 facing the fourth side surface 413-4. The fourth distance L4 may be, for example, a distance measured in the Y-axis direction (e.g., the extension direction of the second rotation shaft R2) from the fourth side surface 413-4 up to an inner surface of the second camera housing 450. The fourth distance L4 may be, for example, the shortest distance between the fourth side surface 413-4 and the inner surface of the second camera housing 450.

Referring to FIG. 9, the camera assembly 410 may be spaced a fifth distance L5 from the corner area 415 to the inner surface of the second camera housing 450 adjacent to the corner area 415. The fifth distance L5 may be, for example, a distance measured in a direction perpendicular to the corner area 415. For example, if the corner area 415 includes a plane, the fifth distance L5 may be a distance measured in the direction of a normal vector of the plane.

In various embodiments, the fifth distance L5 is illustrated as the distance from the corner area 415 to the inner surface of the second camera housing 450 adjacent to the corner area, but the fifth distance L5 may be variously set according to the position of the camera assembly 410 and/or the shape (e.g., a rectangular shape) of the second camera housing 450.

In some embodiments, the virtual rotation center point C of the camera assembly 410 may not coincide with a physical center point of the camera assembly 410. For example, the camera assembly 410 may be provided in a rectangular shape of which a length in the X-axis direction is longer than a length in the Y-axis direction. In this case, the fifth distance L5 may be different according to each corner area 415. In various embodiments, the camera assembly 410 may have a rectangular parallelepiped shape that extends longer from the virtual rotation center point C in a direction (e.g., +X-axis direction) in which the first magnetic body (e.g., the first magnetic body 491 of FIG. 5A and the ball 434 of FIG. 5A) is disposed.

In various embodiments, if the position of the virtual rotation center point C of the camera assembly 410 moves in a X/–X-axis direction or Y/–Y-axis direction from a center point (not shown) of the second camera housing 450, the fifth distance L5 may be defined as distances different from each other.

In various embodiments, in the camera assembly 410 may be disposed inside the second camera housing 450 so that the fifth distance L5 is greater than each of the first distance L1, the second distance L2, the third distance L3, and the fourth distance L4.

In various embodiments, the third coil 483 may be disposed closer to the inner surface of the second camera housing 450 than the second side surface 413-2 of the camera assembly 410. The second coil 482 may be disposed closer to the inner surface of the second camera housing 450 than the fourth side surface 413-4 of the camera assembly 410.

Figure 10A:
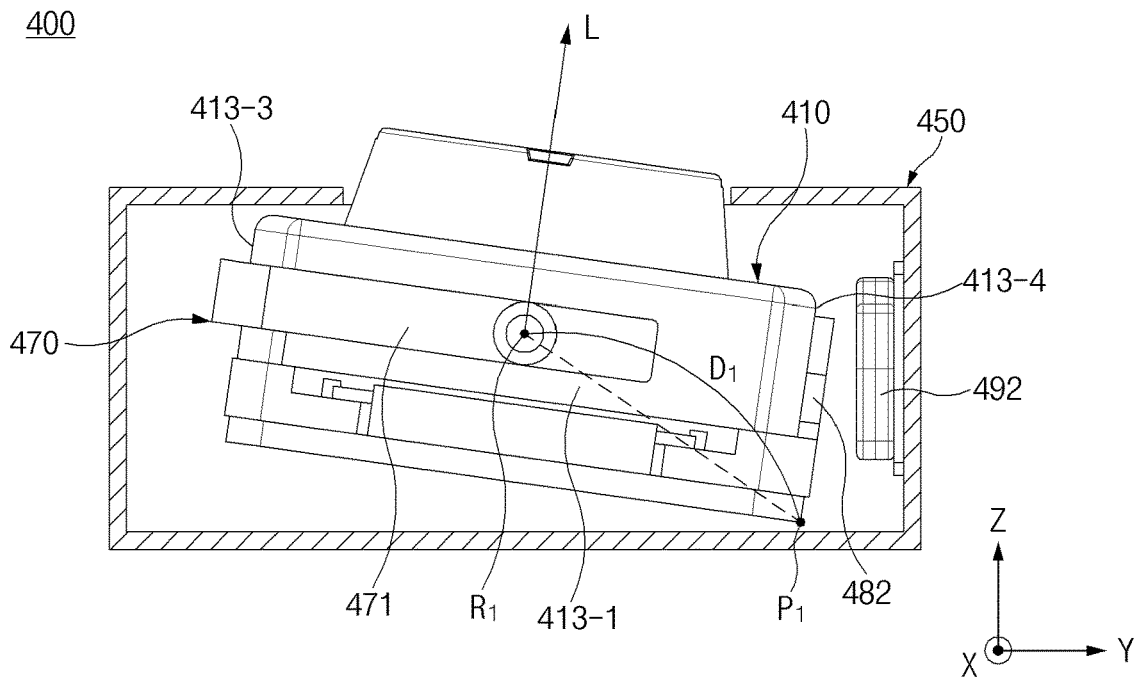
FIGS. 10A and 10B are views illustrating the camera assembly of the camera module according to various embodiments of the disclosure.
Figure 10B:
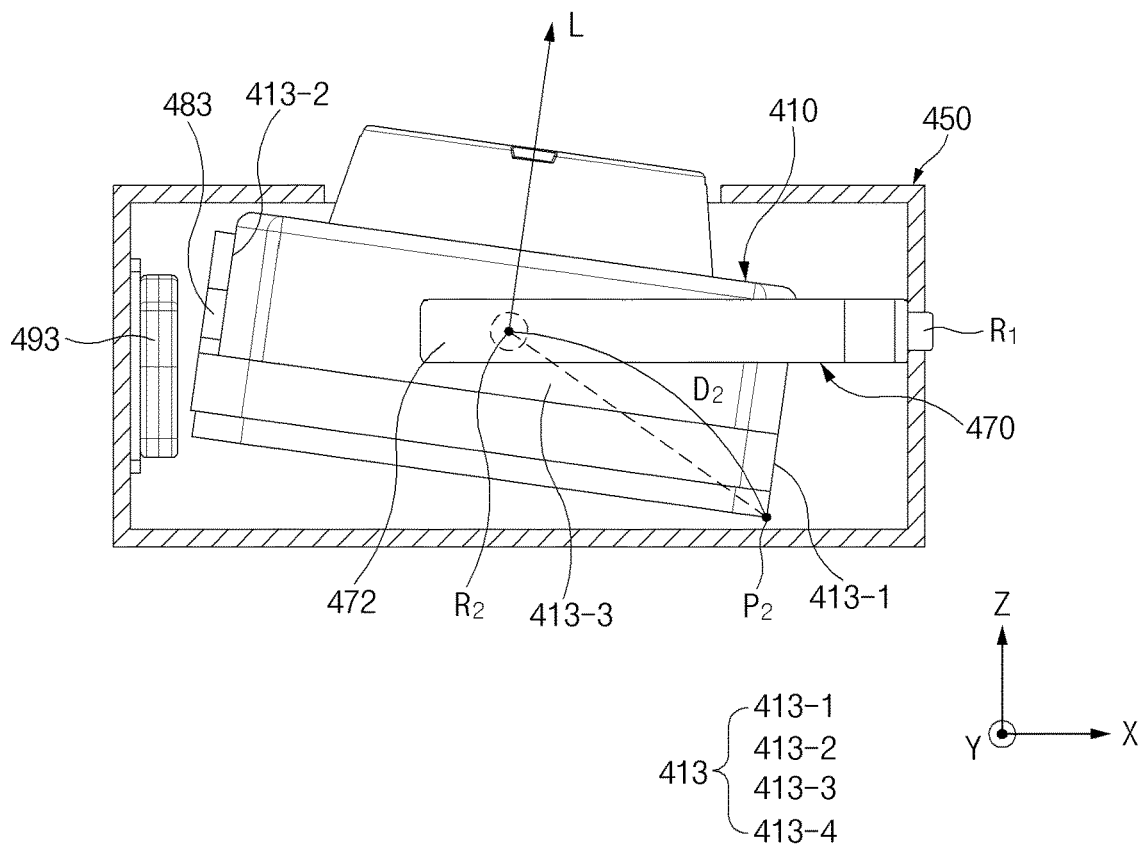

FIGS. 10A and 10B are views illustrating the camera assembly of the camera module according to various embodiments of the disclosure.

Referring to FIG. 10A, it is a view illustrating first rotation of the camera assembly.

Referring to FIG. 10B is a view illustrating second rotation of the camera assembly.

In an embodiment, the first rotation may be rotation in which the camera assembly 410 rotates about the first rotation shaft R1, and the second rotation may be rotation in which the camera assembly 410 rotates about the second rotation shaft R2.

In an embodiment, the camera assembly 410 may relatively rotate about the first rotation shaft R1 with respect to the second camera housing 450 together with the connection member 470. For example, the camera assembly 410 may be coupled to the connection member 470 in a direction that is perpendicular to the first rotation shaft R1 (e.g., coupled by the second rotation shaft R2) in order to integrally rotate.

In an embodiment, the camera assembly 410 may relatively rotate about the second rotation shaft R2 with respect to the second camera housing 450 and the connection member 470. For example, the connection member 470 may be coupled to the second camera housing 450 in a direction that is perpendicular to the second rotation shaft R2 (e.g., coupled by the first rotation shaft R1. Thus, the camera assembly 410 may rotate separately with respect to the connection member 470.

In an embodiment, the first virtual line C1 from which the first rotation shaft R1 extends may be defined. A first point P1 that is farthest from the first virtual line C1 among the third side surface 413-3 and the fourth side surface 413-4 may be defined. Here, the distance from the first virtual line C1 to the first point P1 may be defined as a first maximum rotation radius D1 of the camera assembly.

In an embodiment, the second camera housing 450 may be provided so that the minimum distance from the first virtual line C1 to the inner surface of the second camera housing 450 is longer than the first maximum rotation radius D1.

In an embodiment, a second virtual line C2 from which the second rotation shaft R2 extends may be defined. A second point P2 farthest from the second virtual line C2 among the first side surface 413-1 and the second side surface 413-2 may be defined. Here, the distance from the second virtual line C2 to the second point P2 may be defined as a second maximum rotation radius D2 of the camera assembly 410.

In an embodiment, the second camera housing 450 may be provided so that the minimum distance from the second virtual line C2 to the inner surface of the second camera housing 450 is longer than the second maximum rotation radius D2.

Figure 11:
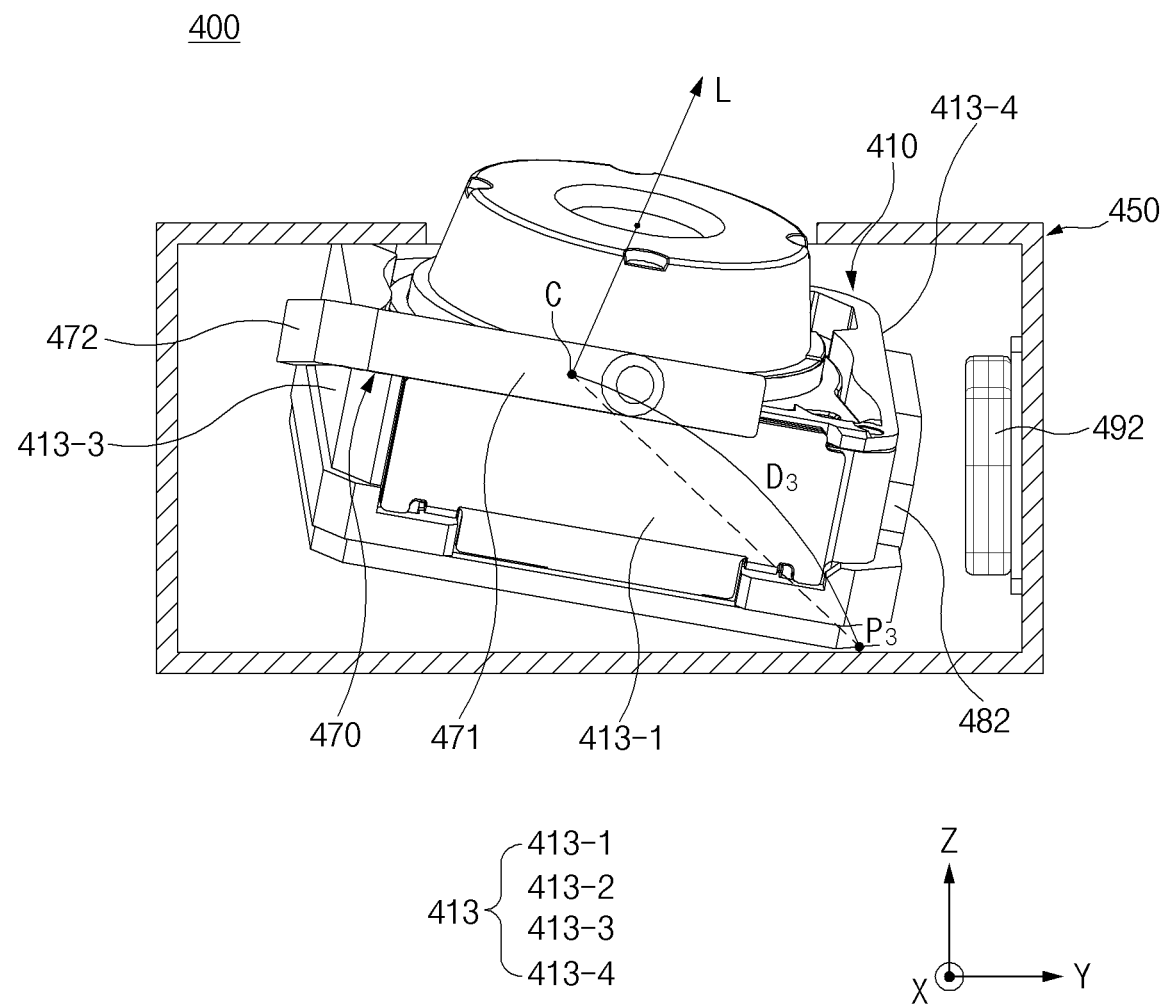
FIG. 11 is a view illustrating third rotation of the camera assembly of the camera module according to an embodiment of the disclosure.

FIG. 11 is a view illustrating third rotation of the camera assembly of the camera module according to an embodiment of the disclosure.

Referring to FIG. 11, it illustrates a camera assembly in which an upper frame (e.g., the upper frame 421 of FIGS. 5A and 5B) is omitted for clarity. In an embodiment, third rotation may be rotation in which the first rotation (e.g., FIG. 10A) and the second rotation (e.g., FIG. 10B) are simultaneously performed.

In an embodiment, the camera assembly 410 may rotate about the virtual rotation center point C. The virtual rotation center point C may be a virtual point defined by meeting the first virtual line C1 and the second virtual line C2 with each other. A third point P3 that is farthest from the virtual rotation center point C among the side surfaces 413 of the camera assembly 410 may be defined.

In various embodiments, the third point P3 may be defined at a portion of the corner area 415. Here, the distance from the virtual rotation center point C to the third point P3 may be defined as a third maximum rotation radius D3 of the camera assembly 410.

In an embodiment, the second camera housing 450 may be provided so that the minimum distance from the inner surface to the virtual center of rotation C is longer than the third maximum rotation radius D3.

Referring to FIGS. 10A, 10B, and 11, the second camera housing 450 of the camera module 400 may be disposed in consideration of the maximum rotation radius (e.g., D1, D2, and D3) of the camera assembly 410. The second camera housing 450 may be provided to have a sufficient internal space so as not to collide with the camera assembly 410 if the camera assembly 410 rotates.

Figure 12A:
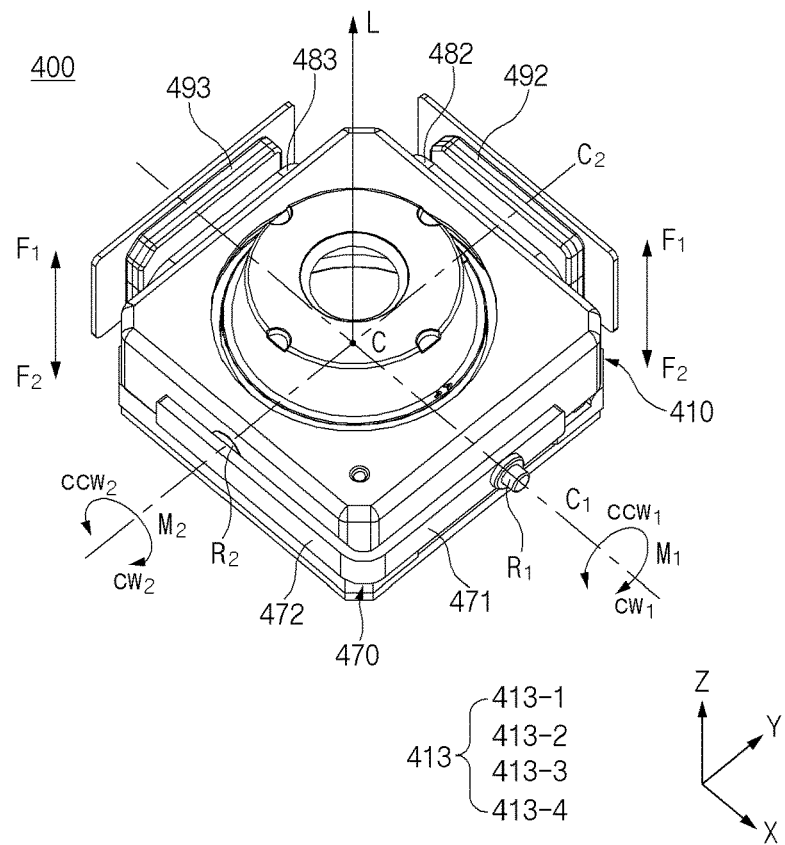
FIGS. 12A and 12B are views illustrating the coil and the magnetic body of the camera module according to various embodiments of the disclosure.
Figure 12B:
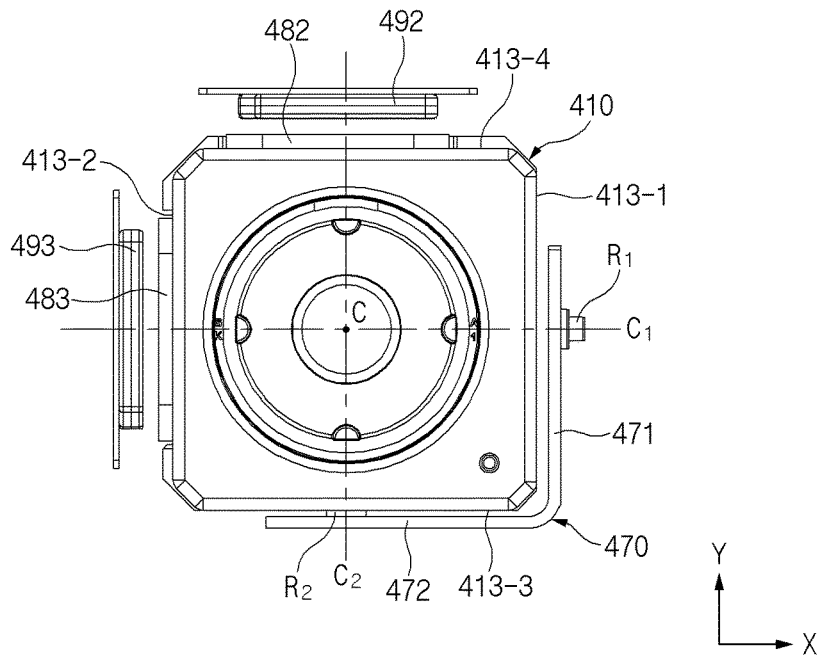

FIGS. 12A and 12B are views illustrating the coil and the magnetic body of the camera module according to various embodiments of the disclosure.

Referring to FIG. 12A, it is a perspective view of the camera module, and referring to FIG. 12B, it is a plan view of the camera module. FIGS. 12A and 12B are views illustrating a state in which the second camera housing is omitted in the camera module 410 of FIG. 6A.

In an embodiment, the camera module 400 may include a second coil 482, a second magnetic body 492 facing the second coil 482, a third coil 483, and a third magnetic body 493 facing the third coil 483.

In an embodiment, the second coil 482 and the third coil 483 may be disposed in the camera assembly 410, and the second magnetic body 492 and the third magnetic body 493 may be disposed in the second camera housing 450. In various embodiments, the second coil 482 and the third coil 483 may be disposed in the second camera housing 450, and the second magnetic body 492 and the third magnetic body 493 may be disposed in the camera assembly 410.

In an embodiment, the second coil 482 may be disposed on the fourth side surface 413-4 of the camera assembly 410. The second magnetic body 492 may be disposed on an area of an inner surface of the second camera housing 450 facing the fourth side surface 413-4 of the camera assembly 410. The second coil 482 and the second magnetic body 492 may be configured to electromagnetically interact with each other. For example, the second coil 482 may be disposed in magnetic fields generated by the second magnetic body 492. For example, if current is applied to the second coil 482, predetermined magnetic force (e.g., Lorentz force) may be applied to the second coil 482.

In an embodiment, a rotation moment about the first rotation shaft R1 may act on the camera assembly 410 of the camera module 400 by the predetermined magnetic force. For example, if magnetic force in an F1 direction is applied to the second coil 482, a rotation moment M in a counterclockwise direction CCW1 may act on the camera assembly 410 of the camera module 400. If magnetic force in the F2 direction is applied to the second coil 482, a rotation moment M1 in the clockwise direction CW1 may act on the camera assembly 410 of the camera module 400.

In various embodiments, the second coil 482 may be disposed on a surface (e.g., the fourth side surface 413-4) facing a surface (e.g., the third side surface 413-3) of the side surfaces 413 of the camera assembly 410, to which the second rotation shaft R2 is coupled. In various embodiments, the second coil 482 may be disposed on a surface (e.g., the fourth side surface 413-4) facing a surface (e.g., the third side surface 413-3) of the side surfaces 413 of the camera assembly 410, which faces the second portion 472 of the connection member 470.

In an embodiment, the third coil 483 may be disposed on the second side surface 413-2 of the camera assembly 410. The third magnetic body 493 may be disposed on an area of an inner surface of the second camera housing 450 facing the second side surface 413-2 of the camera assembly 410. The third coil 483 and the third magnetic body 493 may be configured to electromagnetically interact with each other. For example, the third coil 483 may be disposed in magnetic fields generated by the third magnetic body 493. For example, if current is applied to the third coil 483, predetermined magnetic force (e.g., Lorentz force) may be applied to the third coil 483.

In an embodiment, a rotation moment about the second rotation shaft R2 may act on the camera assembly 410 of the camera module 400 by the predetermined magnetic force. For example, if magnetic force in an F1 direction is applied to the third coil 483, a rotation moment M in a clockwise direction CW2 may act on the camera assembly 410 of the camera module 180. If magnetic force in the F2 direction is applied to the third coil 483, a rotation moment M2 in the counterclockwise direction CCW2 may act on the camera assembly 410 of the camera module 180.

In various embodiments, the third coil 483 may be disposed on a surface (e.g., the second side surface 413-2) facing a surface (e.g., the first side surface 413-1) of the side surfaces 413 of the camera assembly 410, to which the first rotation shaft R1 is coupled. For example, the third coil 483 may be disposed on a surface (e.g., the second side surface 413-2) facing a surface (e.g., the first side surface 413-1) of the side surfaces 413 of the camera assembly 410, which faces the first portion 471 of the connection member 470.

In an embodiment, the second coil 482 may be wound several times around the second rotation shaft R2. The third coil 483 may be wound several times around the first rotation shaft R1. For example, the second coil and the third coil may surround axes, which are perpendicular to each other, several times.

In an embodiment, at least a partial area of the second magnetic body 492, which faces the second coil 482, and at least a partial area of the third magnetic body 493, which faces the third coil 483, face directions that are perpendicular to each other. For example, the second magnetic body 492 may face the direction of the second rotation shaft R2, and the third magnetic body 493 may face the direction of the first rotation shaft R1.

Figure 13:
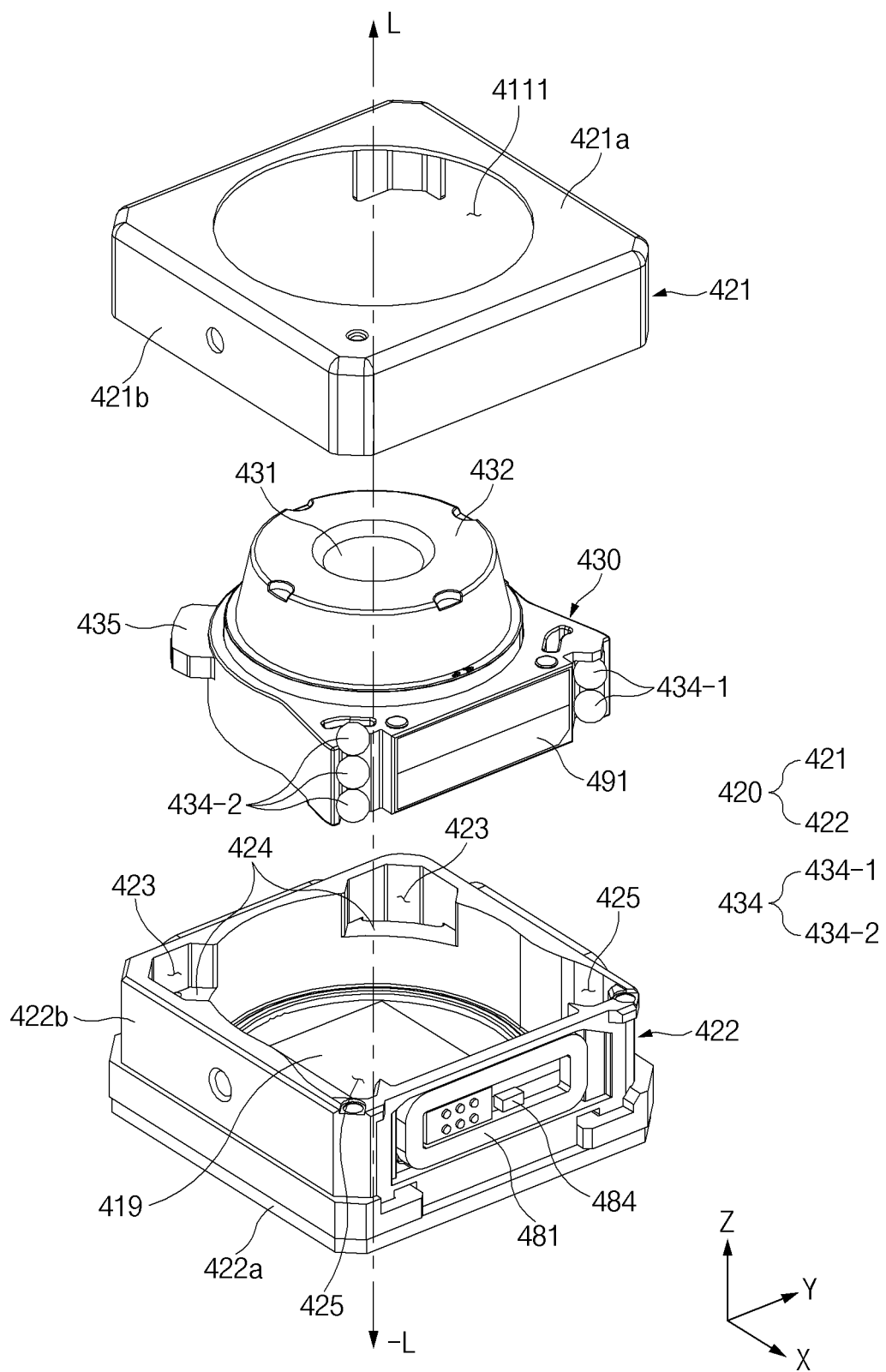
FIG. 13 is an exploded perspective view illustrating the camera assembly of the camera module according to an embodiment of the disclosure.

FIG. 13 is an exploded perspective view illustrating the camera assembly of the camera module according to an embodiment of the disclosure.

Referring to FIG. 13, in an embodiment, the camera assembly 410 may include a lens carrier 430 including one or more lenses 431, an image sensor 419, and a first camera housing 420. For example, the first camera housing 420 may include an upper frame 421 and/or a lower frame 422, which surround at least a portion of the lens carrier 430.

For example, the upper frame 421 and the lower frame 422 may be coupled to define a space therein. The lens carrier 430 may be disposed in a space between the upper frame 421 and the lower frame 422.

In various embodiments, the first camera housing 420 may define at least a portion of a surface (e.g., the top surface 411, the bottom surface 412, and the side surface 413 of FIGS. 6A and 6B) of the camera assembly 410. For example, a first surface 421a of the upper frame 421 may define a top surface of the camera assembly 410 (e.g., the top surface 411 of FIGS. 6A and 6B). A second surface 422a of the lower frame 422 may define bottom surface (e.g., the bottom surface 412 of FIGS. 6A and 6B) of the camera assembly 410. A side surface 421b of the upper frame 421 and a side surface 422b of the lower frame 422 may define a side surface (e.g., the side surface 413 in FIGS. 6A and 6B) of the camera assembly 410.

In various embodiments, a first opening 4111 may be defined in the first surface 421a of the upper frame 421. The image sensor 419 may be disposed on the second surface 422a of the lower frame 422.

In various embodiments, the upper frame 421 and the lower frame 422 may be coupled so that the side surface 421b of the upper frame 421 and the side surface 422b of the lower frame 422 overlap each other.

In an embodiment, the image sensor 419 (e.g., the image sensor 230 of FIG. 2) may be configured to convert an optical signal incident from the lens 431 into an electrical signal. In an embodiment, the image sensor 419 may be disposed on the lower frame 422 of the camera assembly 410. For example, the image sensor 419 may be disposed in a direction facing the lens 431. Thus, if the camera assembly 410 rotates (e.g., FIGS. 10 and 11), the image sensor 419 may rotate together with the camera assembly 410. For example, if the camera assembly 410 rotates, a relative position of the image sensor 419 with respect to the lens 431 may be constantly maintained.

In an embodiment, the lens carrier 430 may include the lens barrel 432. The lens barrel 432 may be disposed to surround the lens 431. At least a portion of the lens barrel 432 may be aligned with the first opening 4111 so that external light is incident.

In various embodiments, the lens carrier 430 may be configured to linearly move in the direction of the optical axis (L/–L) of the lens within the first camera housing 420. For example, if the lens carrier 430 moves in a +L axis direction, a distance between the lens 431 included in the lens carrier 430 and the image sensor 419 may increase. For example, if the lens carrier 430 moves in a–L axis direction, a distance between the lens 431 included in the lens carrier 430 and the image sensor 419 may decrease. Thus, a focal length of the camera module 400 may be compensated according to a distance from a component.

In various embodiments, the lens carrier 430 may linearly move in the Z-axis direction in a basic state of the camera module 400. In various embodiments, the lens carrier 430 may linearly move in the direction of the optical axis L of the lens 431, which is inclined at a predetermined angle with respect to the Z-axis while the camera module 400 rotates.

In an embodiment, the camera assembly 410 may further include a first coil 481 and first magnetic body 491, which are related to the movement of the lens carrier 430 in the direction of the optical axis L.

In an embodiment, the first magnetic body 491 may be disposed on a side surface of the lens carrier 430. The first magnetic body 491 may face the first coil 481 disposed in the first camera housing 420. The first magnetic body 491 may electromagnetically interact with the first coil 481.

In an embodiment, the first coil 481 may be disposed on a side surface of the first camera housing 420. The first coil 481 may be disposed on an area facing the first magnetic body 491. For example, the first coil 481 may be disposed in an opening region defined in the side surface 422b of the lower frame 422.

In an embodiment, the camera assembly 410 may include a plurality of balls 434 disposed between the side surface of the lens carrier 430 and the first camera housing 420 and/or a recess 425 in which the plurality of balls 434 are accommodated. For example, the plurality of balls 434 may be disposed between the side surface of the first camera housing 420 and the side surface of the lens carrier 430. The plurality of balls 434 may provide rolling friction force between the lens carrier 430 and the first camera housing 420 if the lens carrier 430 moves in the direction of the optical axis L. In an embodiment, the recess 425 may be defined in the side of the lens carrier 430 and/or may be defined in the first camera housing 420. For example, the recess 425 may guide the plurality of balls 434 so that the balls 434 are rolled. In the illustrated embodiment, the plurality of balls 434 may include a plurality of first balls 434-1 disposed at one side of the first magnetic body 491 and a plurality of second balls 434-2 disposed on the other side of the third magnetic body 433. For example, the plurality of first balls 434-1 and the plurality of second balls 434-2 may be arranged in the direction of the optical axis L of the lens 431.

In an embodiment, the camera assembly 410 may include a guide member 435 protruding from the side surface of the lens carrier 430 and a guide rail 423 which is disposed in the first camera housing 420 and in which the guide member 435 is accommodated. For example, the guide rail 423 may be disposed on the lower frame 422. The guide member 435 may be accommodated in the guide rail 423 in order to guide the lens carrier 430 to move in the direction of the optical axis L.

In an embodiment, the guide rail 423 may extend to be opened from a stepped surface 424 disposed on the side surface 422b of the lower frame 422 in the upward direction (e.g., the direction of the optical axis L of the lens 431). If the lens carrier 430 moves downward, the stepped surface 424 may support the guide member 435 to limit a movement range of the lens carrier 430 in the downward direction.

In various embodiments, the camera assembly 410 may include a control circuit (not shown) for controlling the first coil 481 and a first sensor 484. The control circuit (not shown) may control linear movement of the lens carrier 430 in the direction of the optical axis L based on a signal sensed from the first sensor 484. For example, the control circuit may detect the relative position of the first magnetic body 491 with respect to the first coil 481 through the first sensor 484, detect the lens carrier, in which the first magnetic body 491 is disposed, based on the relative position, and control current applied to the first coil 481 in order to reduce an offset between the current position and a target position.

Figure 14:
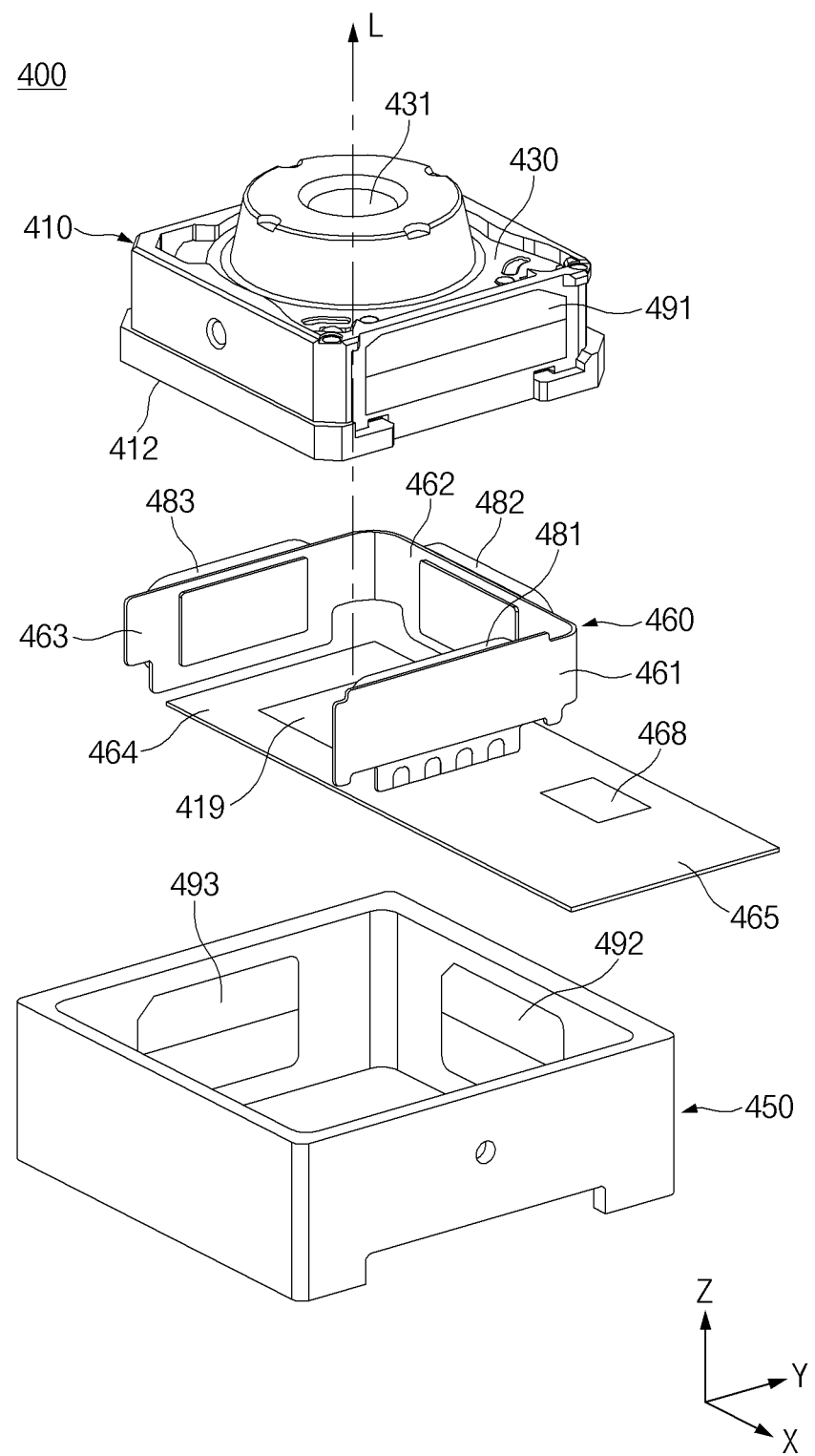
FIG. 14 is a view illustrating a camera module according to an embodiment of the disclosure.
Figure 15:
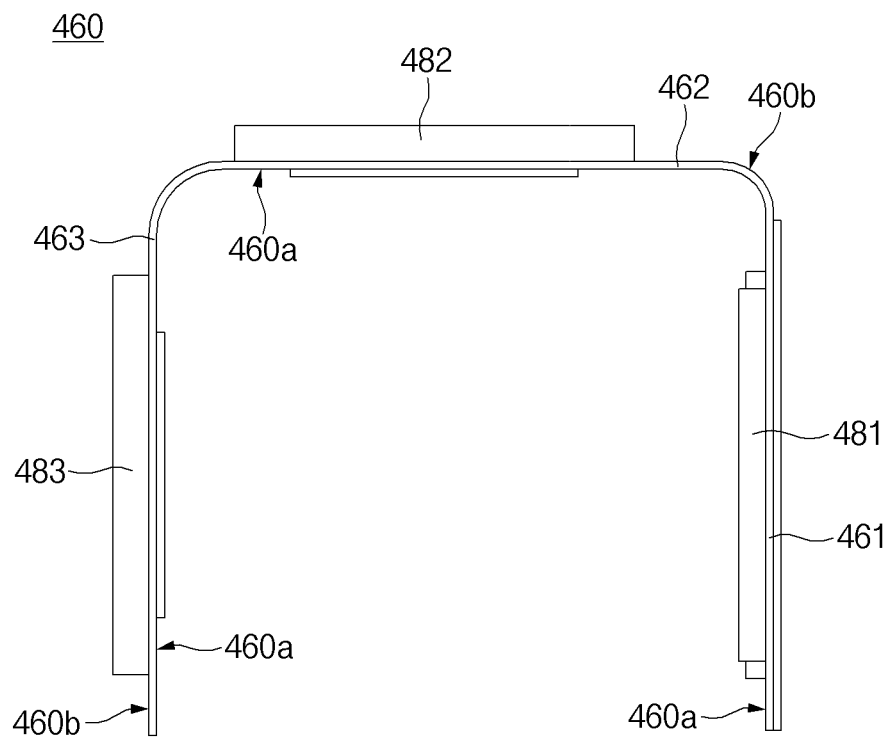
FIG. 15 is a view illustrating a PCB of the camera module according to an embodiment of the disclosure.
Figure 15:
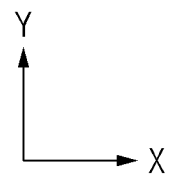

FIG. 14 is a view illustrating a camera module according to an embodiment of the disclosure. FIG. 15 is a view illustrating a PCB of the camera module according to an embodiment of the disclosure. FIGS. 12A and 12B illustrate the camera assembly 410 from which the upper frame (e.g., the upper frame 421 of FIG. 13) is omitted for clarity.

Referring to FIG. 14, in an embodiment, the camera module 400 may include a PCB 460 surrounding at least a portion of the camera assembly 410. For example, the PCB 460 may be coupled to a side surface (e.g., the side surface 413 of FIGS. 6A and 6B) of the camera assembly 410. The PCB 460 may include an inner surface 460a facing the lens carrier 430 and an outer surface 460b facing the second camera housing 450.

Referring to FIG. 15, in an embodiment, the second coil 482 and the third coil 483 may be disposed on the outer surface 460b of the PCB 460, and the first coil 481 may be disposed on the inner surface 460a of the PCB 460. The second coil 482 and the third coil 483 may be configured to interact with the second magnetic body 492 and the third magnetic body 493, respectively, and the first coil 481 may be configured to interact with the first magnetic body 491.

In an embodiment, the PCB 460 may include a second area 462 on which the second coil 482 is disposed, a third area 463 on which the third coil 483 is disposed, and a first area 461 on which the first coil 481 is disposed.

In an embodiment, the second area 462 may be provided between the third area 463 and the first area 461. The third area 463 and the first area 461 may be provided to face each other. In various embodiments, the second area 462 may face a direction that is perpendicular to a direction toward the third area 463 or the first area 461.

In an embodiment, the camera module 400 may further include a control circuit (not shown) configured to control the second coil 482, the third coil 483, and the first coil 481. The control circuit may control current flowing through the second coil 482 and the third coil 483 in order to allow the camera assembly 410 to rotate within a predetermined range. The control circuit may control the current flowing through the first coil 481 in order to allow the lens carrier 430 to linearly move. In various embodiments, the control circuit may be mounted on the PCB 460.

In an embodiment, the control circuit may further include a hall sensor configured to sense magnetic fields. The control circuit may detect states of the lens carrier 430 and the camera assembly 410 through a signal sensed through the hall sensor. The signal sensed by the hall sensor may be fed back to a control circuit Accordingly, the control circuit may control the camera assembly 410 or the lens carrier 430 based on the feedback signal. In various embodiments, the hall sensor may be mounted on the PCB 460.

In various embodiments, the hall sensor (not shown) may include a second hall sensor (e.g., the second sensor 485 and the third magnetic body 493 of FIGS. 5A, 5B, 6A, and 6B) for sensing relative positions of the second magnetic body 492 and the second coil 482, a third hall sensor (e.g., the third sensor 486 of FIG. 6B) for sensing relative positions of the third magnetic body 493 and the third coil 483, and a first hall sensor (e.g., the first sensor 484 of FIG. 13) for sensing relative positions of the first magnetic body 491 and the first coil 481.

In various embodiments, an electronic device (e.g., the electronic device 101 of FIG. 1 and the electronic device 300 of FIGS. 3A and 3C) may include a camera module 400 and a control circuit for controlling the camera module 400. For example, the control circuit may include a processor (e.g., the processor 120 of FIG. 1) included in the electronic device (e.g., the electronic device 101 of FIG. 1). In various embodiments, the control circuit may be disposed on the PCB 460 of the camera module 400 or may be disposed on a substrate included in the electronic device.

In various embodiments, the camera module 400 may include a driving circuit 468 (e.g., a coil driver and a controller) electrically connected to the control circuit in order to control the coils.

In various embodiments, the PCB 460 may further include a fourth area 464 on which the image sensor 419 is disposed. For example, the fourth area 464 may extend from at least one of a first area 461, a second area 462, or a third area 463. For example, the fourth area 464 may be disposed on the bottom surface 412 of the camera assembly 400 or may define at least a portion of the bottom surface 412.

In various embodiments, the PCB 460 may further include a fifth area 465 (e.g., the extension portion 469 of FIG. 4) extending from at least one of the first area 461, the second area 462, the third area 463, or the fourth area 464. For example, the fifth area 465 may extend outside the second camera housing 450.

In various embodiments, the driving circuit 468 may be controlled so that the driving circuit applies a predetermined electric signal to at least one of the first coil 481, the second coil 482, or the third coil 483.

In various embodiments, the driving circuit 468 may be disposed on the fifth area 465. However, the position of the driving circuit 468 is not limited to the above-described structure. For example, the driving circuit 468 may be disposed on at least one of a first area 461, a second area 462, a third area 465, a fourth area 464, or a fifth area 465.

In various embodiments, the driving circuit 468 may be disposed inside the camera module 400 or may be disposed outside the camera module 400. For example, the driving circuit 468 may be disposed on the fifth area 465 or be disposed on the substrate included in the electronic device.

Figure 16A:
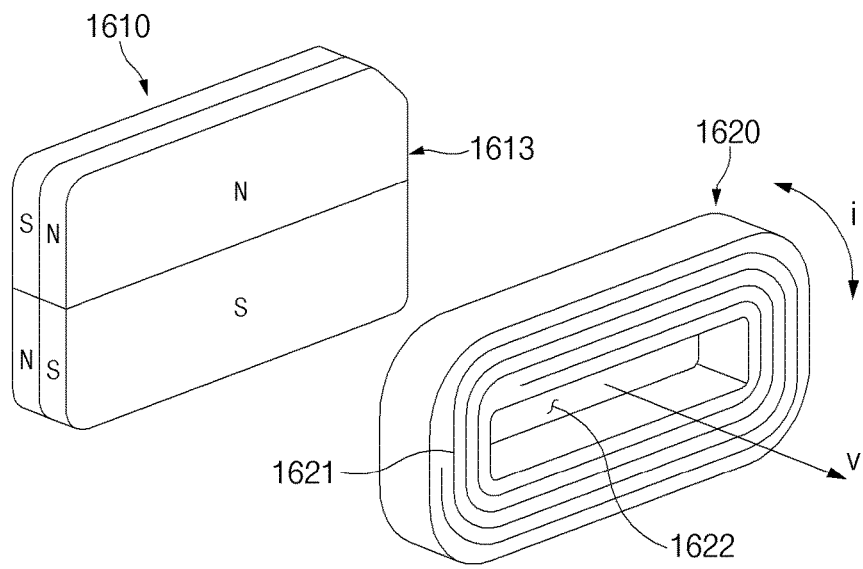
FIGS. 16A, 16B, and 16C are views illustrating an arrangement of the coil and the magnetic body of the camera module according to various embodiments of the disclosure.
Figures 16B, 16C:
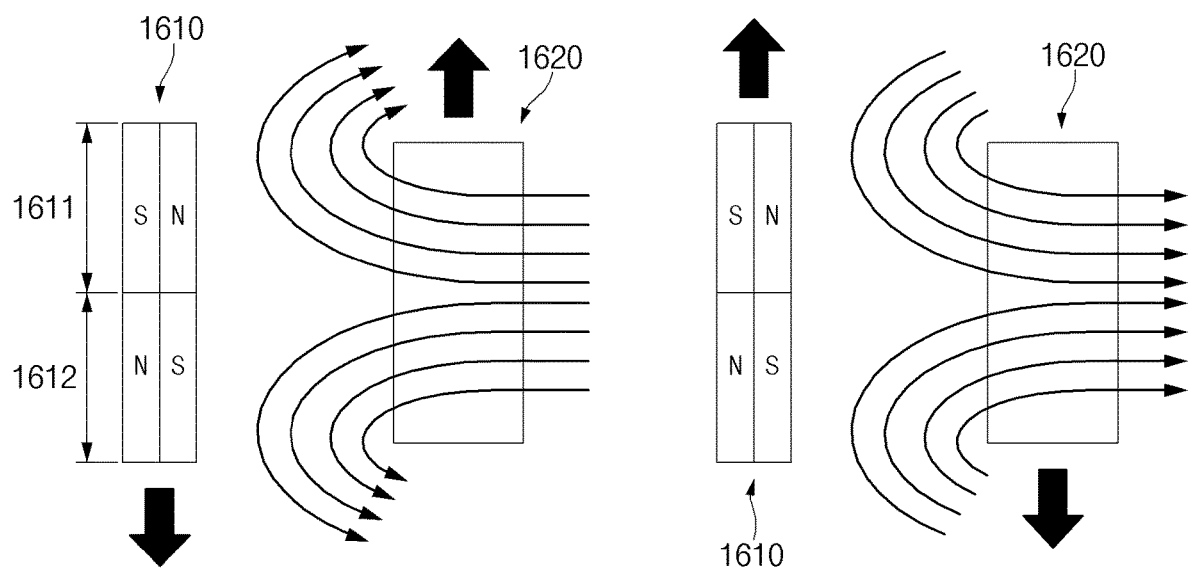

FIGS. 16A, 16B, and 16C are views illustrating an arrangement of the coil and the magnetic body of the camera module according to various embodiments of the disclosure.

A magnetic body 1610 as illustrated in FIGS. 16A and 16C may include a first magnetic body 491, a second magnetic body 492, and/or a third magnetic body 493 as illustrated in FIGS. 4 to 15.

A coil 1620 illustrated in FIGS. 16A and 16C may include a first coil 481, a second coil 482, and/or a third coil 483 illustrated in FIGS. 1 to 13.

In an embodiment, the magnetic body 1610 and the coil 1620 may electromagnetically cross each other when current is applied to the coil 1620. The coil 1620 may be disposed at a position at which the coil 1620 is capable of interacting with magnetic fields generated by the magnetic body 1610.

In an embodiment, one of the magnetic body 1610 and the coil 1620 may be disposed on a fixed structure, and the other may be disposed on a movable structure that moves relative to the fixed structure.

For example, in the rotation of the camera assembly (e.g., the camera assembly 410 of FIGS. 10A and 10B), the magnetic body 1610 may be disposed in a housing (e.g., the second camera housing 450 of FIGS. 10A and 10B) that is a fixed structure, and the coil 1620 may be disposed in a camera assembly (e.g., the camera assembly 410 of FIGS. 10A and 10B), which is a rotatable structure that rotates with respect to the housing.

For example, in the linear movement of the lens carrier (e.g., the lens carrier 430 of FIG. 13), the coil 1620 may be disposed in a camera assembly (e.g., the first camera housing 420 of FIG. 13) which is a fixed structure, and the magnetic body 1610 may be disposed on a lens carrier (e.g., the lens carrier 430 of FIG. 13) that moves linearly with respect to the camera assembly.

Referring to FIG. 16A, the magnetic body 1610 may include a plurality of sub-magnetic bodies 1611 and 1612. For example, the magnetic body 1610 may include two sub-magnetic bodies 1611 and 1612.

In an embodiment, the magnetic body 1610 may include an opposing surface 1613 facing the coil 1620. In various embodiments, the magnetic body 1610 may be disposed so that the opposing surface 1613 has at least two polarities. For example, a portion of the opposing surface 1613 may have an N-pole, and the other portion of the opposing surface 1613 may have an S-pole. In an embodiment, the N and S poles may be disposed in a direction parallel to a direction in which the N and S poles intend to move.

According to an embodiment, in the rotation of the camera assembly (e.g., the camera assembly 410 of FIGS. 10A and 10B), some (e.g., the first coil 481 and the second coil 482) of the plurality of coils (e.g., the first coil 481, the second coil 482, and the third coil) may be disposed on the fixed structure (for example, the second camera housing 450 in FIGS. 10A and 10B), and another coil (e.g., the third coil 483) may be disposed on the rotatable structure (e.g., the camera assembly 410 of FIGS. 10A and 10B). In addition, in relation to the arrangement of the plurality of coils, some (e.g., the first magnetic body 491 and the second magnetic body 492) of the plurality of magnetic bodies (e.g., the first magnetic body 491, the second magnetic body 492, and the third magnetic body 493) may be disposed on the rotatable structure (e.g., the camera assembly 410 of FIGS. 10A and 10B), and another magnetic body (e.g., the third magnetic body 493) may be disposed on the fixed structure (e.g., the second camera housing 450 of FIGS. 10A and 10B).

According to an embodiment, the plurality of coils and the plurality of magnetic bodies may be disposed based on a function (e.g., an auto focusing function, an image stabilization function) performed in the camera module 400. For example, some (e.g., the third coil 483) of the plurality of coils related to the auto-focus function and some (e.g., the third magnetic body 493) of the plurality of magnetic bodies may be disposed on the rotatable structure. In addition, other coils (e.g., the first coil 481 and the second coil 482) of the plurality of coils related to the image stabilization function may be disposed on the rotatable structure, and other magnetic bodies (e.g., the first magnetic body 491 and the second magnetic body 492) among the plurality of magnetic bodies may be disposed on the fixed structure.

Referring to FIG. 16A, the coil 1620 may be formed by winding a conductive wire 1621 several times. A vector v extending from the opposing surface 1613 of the magnetic body 1610 and passing through a region 1622 surrounded by the conducting wire 1621 may be defined. For example, the coil 1620 may be provided so that the conductive wire 1621 winds the vector v several times. Current in a clockwise or counterclockwise direction may flow around the vector v through the coil 1620. In various embodiments, the second coil 482 illustrated in FIGS. 12A and 12B may be provided to surround a second virtual line C2 in which the second rotation shaft R2 extends. In various embodiments, the third coil 483 illustrated in FIGS. 12A and 12B may be provided to surround the first virtual line C1 in which the first rotation shaft R1 extends.

Referring to FIG. 16B, current flowing in the clockwise direction may flow through the coil 1620. Magnetic force (e.g., Lorentz force) in an upward direction may be applied to the coil 1620 based on the drawing. Here, if the coil 1620 is disposed on the fixed structure, it may be understood that downward magnetic force is applied to the magnetic body 1610.

Referring to FIG. 16C, the current flowing in the counterclockwise direction may flow through the coil 1620. The magnetic force (e.g., Lorentz force) in the downward direction may be applied to the coil 1620 based on the drawing. Here, when the coil 1620 is disposed on the fixed structure, it may be understood that the upward magnetic force (Lorentz force) is applied to the magnetic body 1610.

However, the magnetic body and coil disclosed in the disclosure are not necessarily limited to the form illustrated in FIG. 16A. For example, the magnetic body may have opposing surfaces having a single polarity.

However, the magnetic body disclosed in the disclosure is not necessarily limited to the form illustrated in FIG. 16A. For example, the magnetic body may include two sub-magnetic bodies. For another example, the magnetic body may be provided so that an N-pole sub-magnetic body defines a portion of the opposing surface, and an S-pole sub-magnetic body defines a remaining portion of the opposing surface.

FIGS. 17, 18A, 18B, 19A, 19B, 20A, and 20B are exploded perspective views illustrating the camera module according to various embodiments. Hereinafter, contents duplicated with those described in FIGS. 4 to 15 will be omitted.

Figure 17:
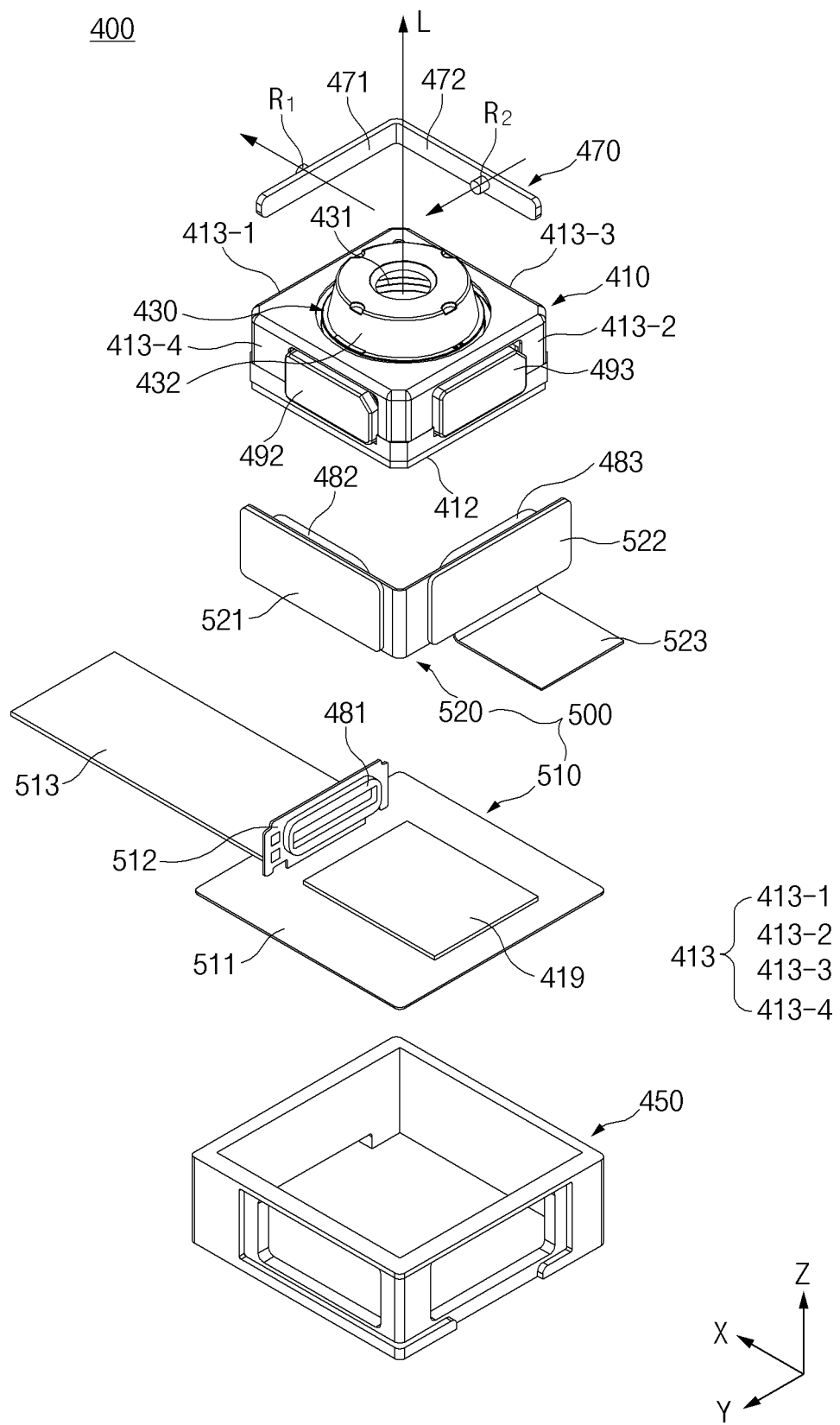
FIG. 17 is an exploded perspective view of a camera module according to an embodiment of the disclosure.

FIG. 17 is an exploded perspective view of the camera module according to an embodiment of the disclosure.

In an embodiment, the camera module 400 may include a second camera housing 450, a camera assembly 410 disposed inside the second camera housing 450, a connection member 470 disposed between the second camera housing 450 and the camera assembly 410, and/or a PCB 500 on which the coils 481, 482, and 483 are disposed.

In an embodiment, the connection member 470 may be coupled to the side surface 413 of the camera assembly 410. Referring to the drawing, the connection member 470 may include a first rotation shaft R1 disposed at the first portion 471 and a second rotation shaft R2 disposed at the second portion 472. For example, the first rotation shaft R1 may be coupled to the second camera housing 450, and the second rotation shaft R2 may be coupled to the camera assembly 410. For example, the first portion 471 may be disposed between the first side surface 413-1 of the camera assembly 410 and the second camera housing 450, and the second portion 472 may be disposed between the third side surface 413-3 of the camera assembly 410 and the second camera housing 450.

In an embodiment, a second magnetic body 492 and a third magnetic body 493 may be disposed on the side surface 413 of the camera assembly 410. For example, the second magnetic body 492 may be disposed on the fourth side surface 413-4, and the third magnetic body 493 may be disposed on a second side surface 413-2 adjacent to the second side surface 413-2. The second magnetic body 492 may be related to the rotation of the first rotation shaft R1 of the camera assembly 410 together with the second coil 482. The third magnetic body 493 may be related to the rotation of the second rotation shaft R2 of the camera assembly 410 together with the third coil 483. In an embodiment, a first magnetic body (e.g., the first magnetic body 491 of FIGS. 5A and 13) may be disposed inside the camera assembly 410. The first magnetic body 491 may be related to linear movement of the lens carrier 430 in the direction of the optical axis L together with the first coil 481.

Referring to FIG. 17, the second magnetic body 492 and the third magnetic body 493 may be a different side surface 413 of the camera assembly 410 so as not overlap the first portion 471 and the second portion 472 of the connection member 470. For example, the first portion 471 may be disposed on the first side surface 413-1, the second portion 472 may be disposed on the third side surface 413-3, the second magnetic body 492 may be disposed on the fourth side surface 413-4, and the third magnetic body 493 may be disposed on the second side surface 413-2. However, as described above, the arrangement of the magnetic materials 491, 492, and 493 is not limited as illustrated in the drawings.

In an embodiment, the PCB 500 may include a first PCB 510 coupled to the camera assembly 410 and a second PCB 520 disposed in the second camera housing 450. In some embodiments, the PCB 500 may include a movable structure (e.g., the first PCB 510 coupled to the camera assembly 410) and a fixed structure (e.g., the second PCB 520 coupled to the second camera housing 450). For example, the movable structure may include a structure that rotates in axes R1 and R2 that are perpendicular to the optical axis L of the lens 431 in relation to the image stabilization function.

In an embodiment, the first PCB 510 may be coupled to the camera assembly 410. The first PCB 510 may include a first area 511, a second area 512, and a third area 513 extending from the second area 512 to the outside of the second camera housing 450.

In an embodiment, an image sensor 419 may be disposed on the first area 511. The first area 511 may be disposed on the bottom surface 412 of the camera assembly 410 or may define the bottom surface 412. In various embodiments, the first area 511 may rotate together with the camera assembly 410 if the camera assembly 410 rotates about the first rotation shaft R1 and the second rotation shaft R2. Accordingly, even if the camera assembly 410 rotates for the image stabilization, a distance or position between the image sensor 419 and the lens 431 may be constantly maintained. In various embodiments, if the lens carrier 430 linearly moves in the direction of the optical axis L, a distance between the first area 511 and the lens 431 may vary. In this case, the distance between the image sensor 419 and the lens 431 may vary. Accordingly, the focus may vary based on the distance from the component.

In an embodiment, the first coil 481 may be disposed on the second area 512. The second area 512 may be disposed on the side surface 413 of the camera assembly 410. For example, the second area 512 may be disposed on the first side surface 413-1 of the camera assembly 410 in order to face the first magnetic body 491 in which the first coil 481 is disposed in the lens carrier 430.

In an embodiment, the second PCB 520 may surround at least a portion of the second camera housing 450. The second PCB 520 may include a fourth area 521, a fifth area 522, and a sixth area 523 extending from the fourth area 521 or the fifth area 522.

In an embodiment, the second coil 482 may be disposed on the fourth area 521. The fourth area 521 may be disposed on a side surface of the second camera housing 450, which faces the fourth side surface 413-4 of the camera assembly 410 so that the second coil 482 faces the second magnetic body 492. For example, the second coil 482 may be disposed on a side surface of the second camera housing 450 in the Y-axis direction.

The third coil 483 may be disposed on the fifth area 522. The fifth area 522 may be disposed on a side surface of the second camera housing 450, which faces the second side surface 413-2 of the camera assembly 410 so that the third coil 483 faces the third magnetic body 493. For example, the third coil 483 may be disposed on a side surface of the second camera housing 450 in the −X-axis direction.

In various embodiments, the camera assembly may rotate about the first rotation shaft R1 by applying current the second coil 482. In various embodiments, the camera assembly 410 may rotate about the second rotation shaft R2 by applying current to the third coil 483.

In various embodiments, the third area 513 of the first PCB 510 and the sixth area 523 (e.g., the extension portion 469 of FIG. 4) of the second PCB 520 may extend the circuit board of the electronic device (e.g., the electronic device 101 of FIG. 1 and the electronic device 300 of FIGS. 3A, 3B, and 3C), for example, a substrate on which a processor (e.g., the processor 120 of FIG. 1) is disposed.

Figure 18A:
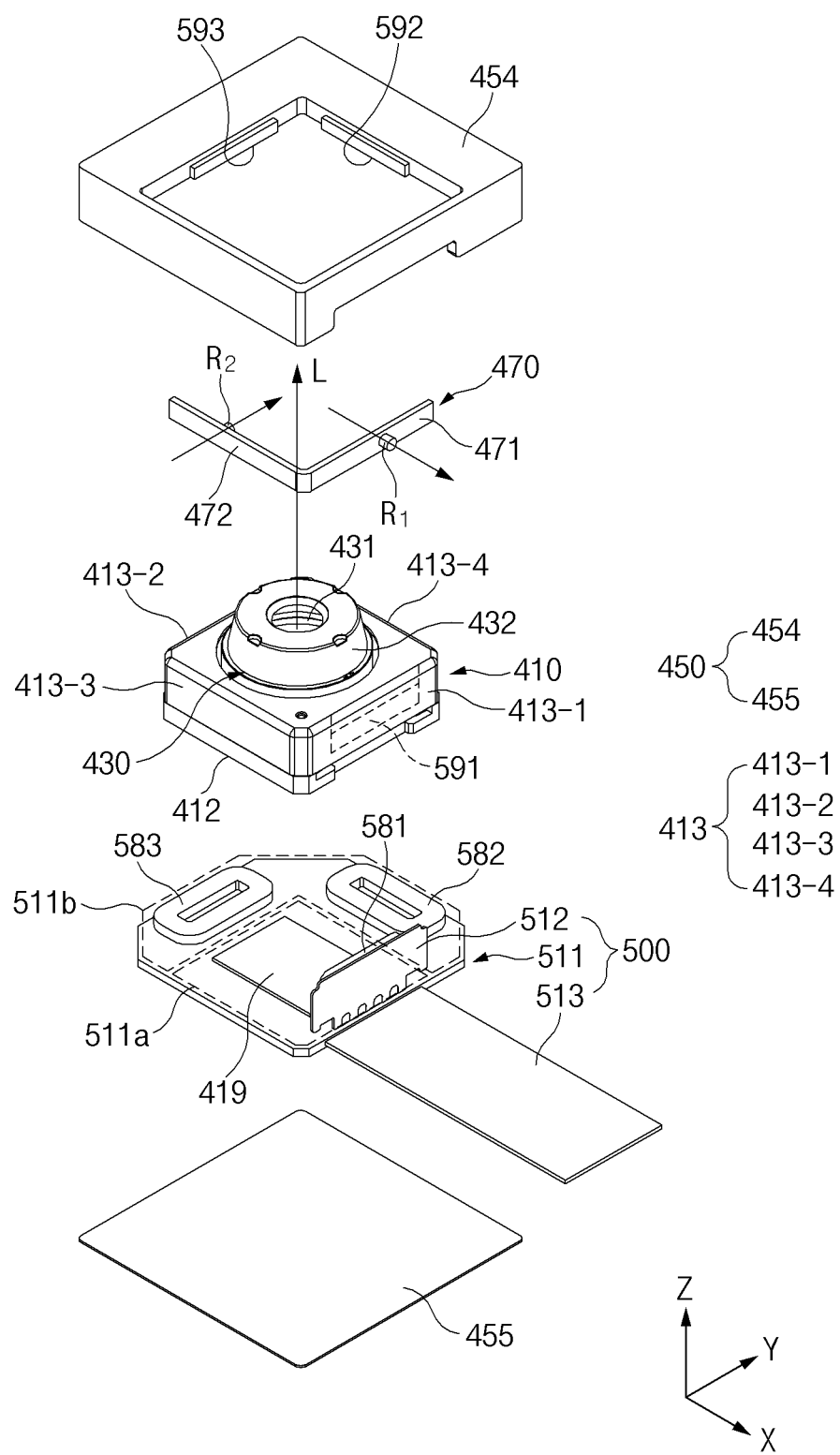
FIGS. 18A and 18B are exploded perspective views of a camera module according to various embodiments of the disclosure.
Figure 18B:
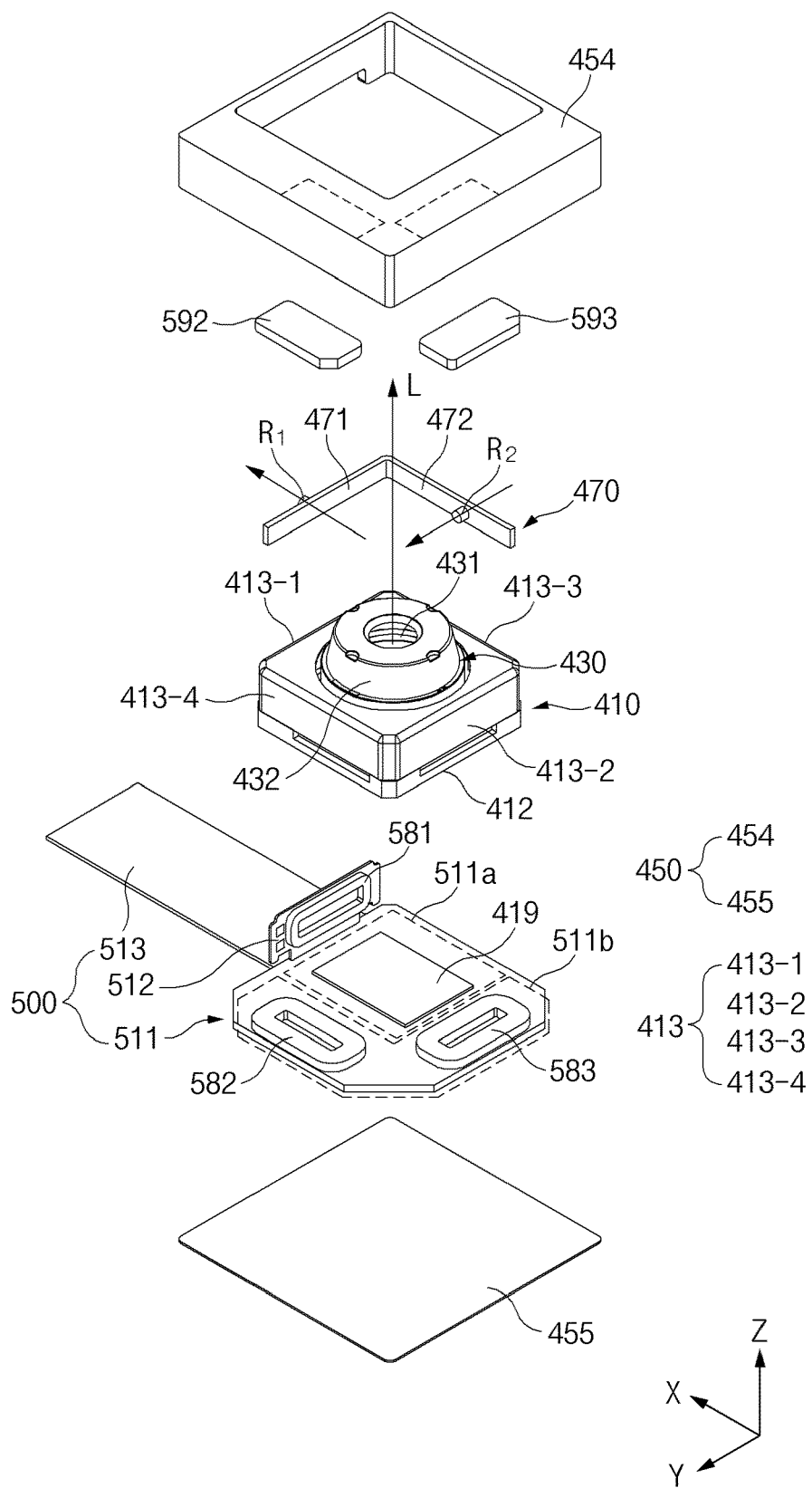

FIGS. 18A and 18B are exploded perspective views of the camera module according to various embodiments of the disclosure.

Referring to FIGS. 18A and 18B, a second camera housing 450 may include a cover 454 defining a first surface (e.g., a surface facing a Z-axis direction) and a portion of a side surface (e.g., a surface facing a direction perpendicular to the Z-axis) and a base 455 defining a second surface (e.g., a surface facing the −Z-axis direction).

In an embodiment, the second camera housing 450 may include a second magnetic body 592 and a third magnetic body 593, which are disposed on the cover 454. The second magnetic body 592 may be disposed to face substantially the Z-axis direction. The third magnetic body 593 may be disposed to face substantially the Z-axis direction. In various embodiments, the second magnetic body 592 and the third magnetic body 593 may be fixedly disposed in the second camera housing 450.

In various embodiments, the second magnetic body 592 may be disposed adjacent to a fourth side surface 413-4 of a camera assembly 410. The third magnetic body 593 may be disposed adjacent to a second side surface 413-2 of the camera assembly 410.

In various embodiments, a center point of the second camera housing 450 in the X-axis and Y-axis directions may not coincide with a cross point (or an optical axis of a lens) of a first rotation shaft R1 and a second rotation shaft R2 of the camera assembly. For example, the center point of the second camera housing 450 may be offset in the Y-axis direction and the −X-axis direction compared to the optical axis L of the lens 431.

In one embodiment, a connection member 470 may include a first rotation shaft R1 disposed at a first portion 471 and a second rotation shaft R2 disposed at a second portion 472, and the first rotation shaft R1 may be coupled to the second camera housing 450, and the second rotation shaft R2 may be coupled to the camera assembly 410. For example, the first portion 471 may be disposed between the first side surface 413-1 of the camera assembly 410 and the second camera housing 450, and the second portion 472 may be disposed between the third side surface 413-3 of the camera assembly 410 and the second camera housing 450.

In an embodiment, the camera assembly 410 may rotate about each of the first rotation shaft R1 and/or the second rotation shaft R2. The camera assembly 410 may be coupled to a PCB 500 disposed in the −Z-axis direction. If the camera assembly 410 rotates, at least a portion of the PCB 500 may rotate together. For example, a first area 511 of the PCB 500, an image sensor 419 disposed on the first area 511, and a second area 512 may rotate together with the camera assembly 410.

In an embodiment, the PCB 500 may include a first area 511, a second area 512, and a third area (e.g., the extension portion of FIG. 4) extending from the first area 511 and the second area 512 to the outside the second camera housing 450.

In an embodiment, an image sensor 419, a second coil 582, and/or a third coil 583 may be disposed on the first area 511. The first area 511 may be coupled to a bottom surface 412 of the camera assembly 410 or may define the bottom surface 412 of the camera assembly 410. The image sensor 419 may be disposed to face the lens 431 included in the camera assembly 410. For example, the optical axis L of the lens 431 may pass through the image sensor 419.

In an embodiment, the first area 511 may include a central area 511a disposed on the bottom surface 412 of the camera assembly 410 and an extension area 511b that further extends from the central area 511a to a peripheral area. The image sensor 419 may be disposed on the central area. The second coil 582 and/or the third coil 583 may be disposed on the extension area.

In an embodiment, the second coil 582 may be disposed to face a second magnetic body 592 disposed on the cover 454. The third coil 583 may be disposed to face a third magnetic body 593 disposed on the cover 454. For example, the second coil 582 may allow the camera assembly 410 to rotate about the first rotation shaft R1 together with the second magnetic body 592. For example, the third coil 583 may allow the camera assembly 410 to rotate about the second rotation shaft R2 together with the third magnetic body 593. In various embodiments, the second coil 582 may be wound several times on an arbitrary axis that is parallel to the Z-axis. The third coil 583 may be wound several times on an arbitrary axis that is parallel to the Z-axis.

In an embodiment, the second area 512 may extend from the first area 511 in the Z-axis direction. The first coil 581 may be disposed on the second area 512. The second area 512 may be provided so that the first coil 581 faces the first magnetic body 591 disposed inside the camera assembly 410. For example, the lens carrier 430 including the first magnetic body 591 may linearly move in the direction of the optical axis L of the lens 431 together with the first magnetic body 591 through the first coil 581. For example, if current is applied to the first coil 581, the lens carrier 430 including the first magnetic body 591 may move in the direction of the optical axis L of the lens 431. Here, the image sensor 419 disposed on the first area 511 may have a different distance (e.g., a focal length) from the lens 431. Accordingly, the auto focusing function of the camera module 400 may be performed.

Figure 19A:
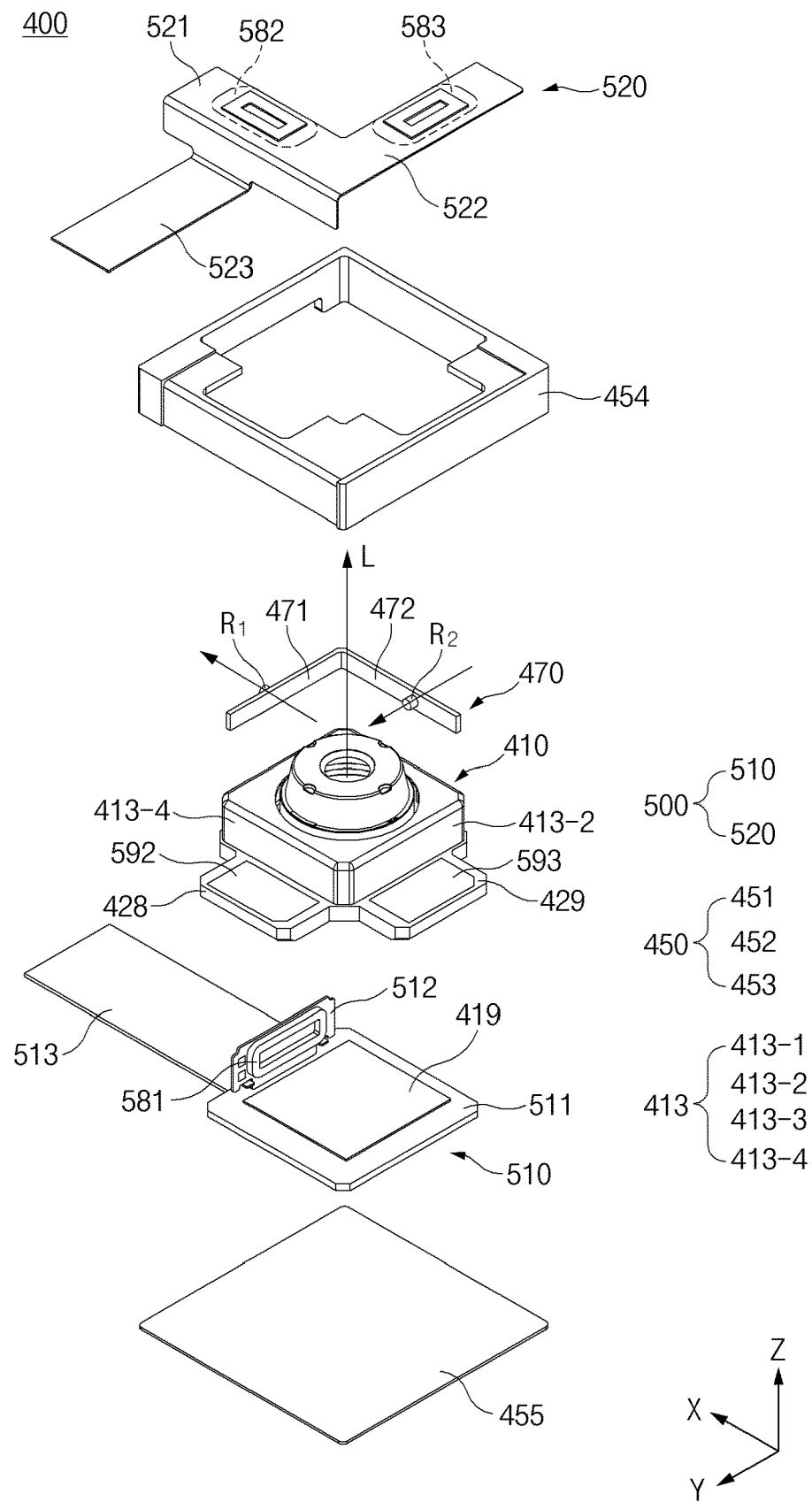
FIGS. 19A and 19B are exploded perspective views of a camera module according to various embodiments of the disclosure.
Figure 19B:
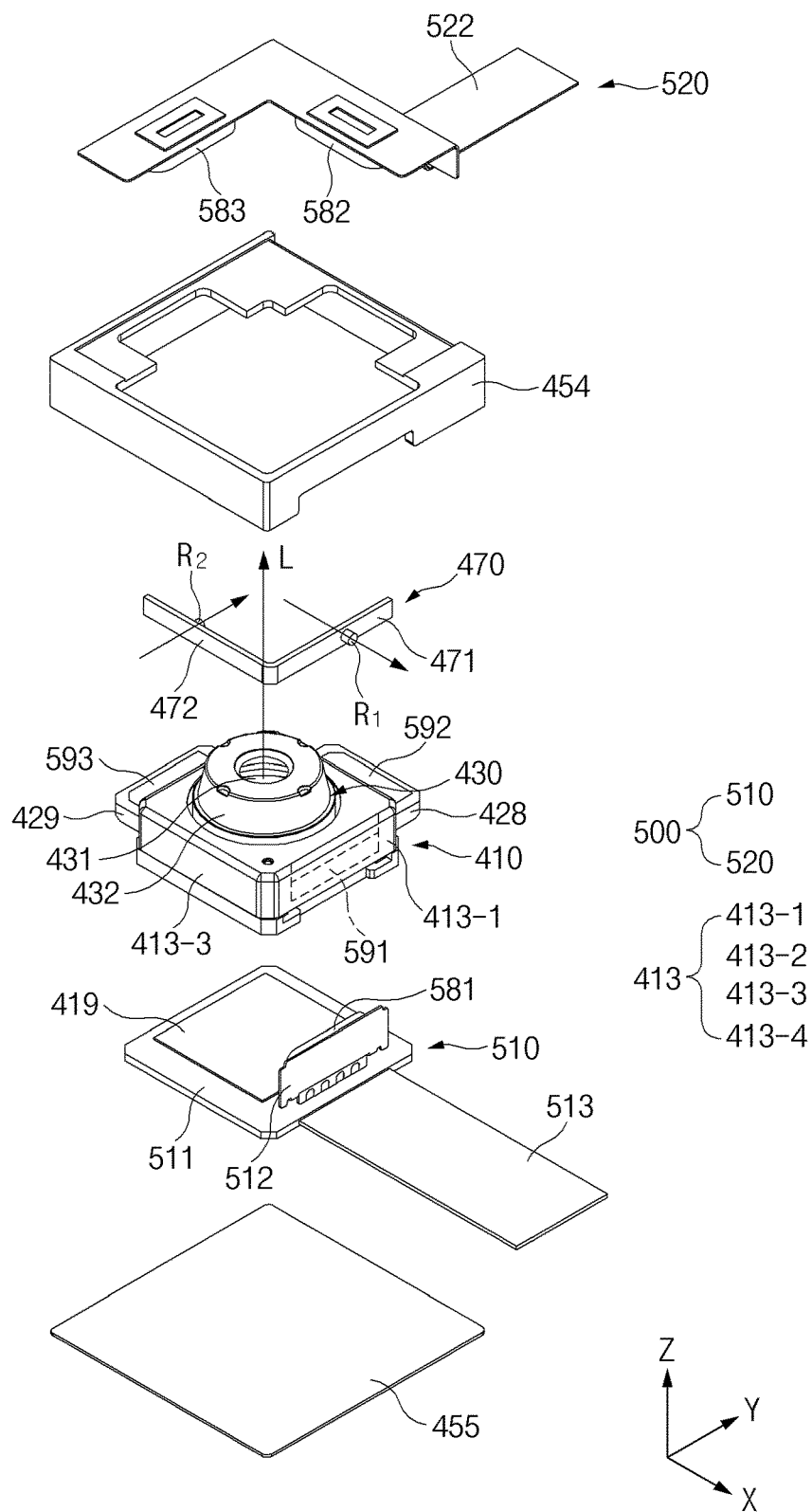

FIGS. 19A and 19B are exploded perspective views illustrating the camera module according to various embodiments of the disclosure.

Referring to FIGS. 19A and 19B, the second camera housing 450 may be coupled to the second PCB 520 including the second coil 582 and/or the third coil 583. For example, the second coil 582 and/or the third coil 583 may be disposed on the cover 454 of the second camera housing 450.

In various embodiments, the center point of the second camera housing 450 in the X-axis and Y-axis directions may not coincide with the cross point (or the optical axis of the lens 431) of the first rotation shaft R1 and the second rotation shaft R2 of the camera assembly 410. For example, the center point of the second camera housing 450 may be offset in the Y-axis direction and the −X-axis direction compared to the optical axis L of the lens 431.

In one embodiment, a connection member 470 may include a first rotation shaft R1 disposed at a first portion 471 and a second rotation shaft R2 disposed at a second portion 472, and the first rotation shaft R1 may be coupled to the second camera housing 450, and the second rotation shaft R2 may be coupled to the camera assembly 410. For example, the first portion 471 may be disposed between the first side surface 413-1 of the camera assembly 410 and the second camera housing 450, and the second portion 472 may be disposed between the third side surface 413-3 of the camera assembly 410 and the second camera housing 450.

In an embodiment, the camera assembly 410 may rotate about the first rotation shaft R1 and/or the second rotation shaft R2. The camera assembly 410 may be coupled to the first PCB 510 disposed in the −Z-axis direction. If the camera assembly 410 rotates, at least a portion of the first PCB 510 may rotate together. For example, the first area 511 of the first PCB 510 and the image sensor 419 disposed on the first area 511 may rotate together with the camera assembly 410.

In an embodiment, the camera assembly 410 may include a first extension portion on which the second magnetic body 592 is disposed and a second extension portion 429 on which the third magnetic body 593 is disposed.

In an embodiment, the first extension portion 428 may extend from the fourth side surface 413-4 of the camera assembly 410 in the Y-axis direction. For example, the second magnetic body 592 may be disposed on the first extension portion 428 so that the second coil 582 is disposed in the Z-axis direction. For example, the second magnetic body 592 and the second coil 582 may be at least partially aligned in the Z-axis direction.

In an embodiment, the second extension portion 429 may extend from the second side surface 413-2 of the camera assembly 410 in the −X axis direction. For example, the third magnetic body 593 may be disposed on the second extension portion 429 so that the third coil 583 is disposed in the Z-axis direction. For example, the third magnetic body 593 and the third coil 583 may be at least partially aligned in the Z-axis direction.

In an embodiment, the PCB 500 may include a first PCB 510 coupled to the camera assembly 410 and a second PCB 520 coupled to the second camera housing 450. In some embodiments, the PCB 500 may include a movable structure (e.g., the first PCB 510 coupled to the camera assembly 410) and a fixed structure (e.g., the second PCB 520 coupled to the second camera housing 450). For example, the movable structure may include a structure (e.g., the camera assembly 410) that rotates in axes R1 and R2 that are perpendicular to the optical axis L of the lens 431 in relation to the image stabilization function.

In an embodiment, the first PCB 510 may include a first area 511, a second area 512, and/or a third area extending from the first area 511 and the second area 512 to the outside the second camera housing 450.

In an embodiment, the image sensor may be disposed on the first area 511. The first area 511 may be coupled to a bottom surface 412 of the camera assembly 410 or may define the bottom surface 412 of the camera assembly 410. The image sensor 419 may be disposed to face the lens 431 included in the camera assembly 410. For example, the optical axis L of the lens 431 may pass through the image sensor 419. For example, if the camera assembly 410 rotates, the image sensor 419 may rotate together.

In an embodiment, the second area 512 may extend from the first area 511 in the Z-axis direction. The first coil 581 may be disposed on the second area 512. The second area 512 may be provided so that the first coil 581 faces the first magnetic body 591 disposed inside (e.g., the lens carrier 430) the camera assembly 410. The second area 512 may be disposed, for example, on the first side surface 413-1 of the camera assembly 410.

In one embodiment, the second PCB 520 may include a fourth area 521, a fifth area 522, and/or a sixth area 523 extending from the fourth area 521 and the fifth area 522. The second PCB 520 may be disposed on the cover so that the fourth area 521 and the fifth area 522 define an inner surface of the cover 454. For example, the second PCB 520 may be coupled to the cover 454 so that the second coil 582 faces the second magnetic body 592 disposed in the −Z-axis direction through the inner surface of the cover 454, and the third coil 583 faces the third magnetic body 593 disposed in the −Z-axis direction through the inner surface of the cover.

In an embodiment, the second coil 582 may be disposed on the fourth area 521. For example, the second coil 582 may be disposed adjacent to the fourth side surface 413-4 of the camera assembly. For example, the second coil 582 may be disposed to face the second magnetic body 592 in the −Z-axis direction. In various embodiments, the second coil 582 may be wound several times on an arbitrary axis that is parallel to the Z-axis.

In an embodiment, the third coil 583 may be disposed on the fifth area 522. For example, the third coil 583 may be disposed adjacent to the second side surface 413-2 of the camera assembly. For example, the third coil 583 may be disposed to face the third magnetic body 593 in the −Z-axis direction. In various embodiments, the third coil 583 may be wound several times on an arbitrary axis that is parallel to the Z-axis.

For example, the second magnetic body 592 and the second coil 582 may be at least partially aligned in the Z-axis. For example, the third magnetic body 593 and the third coil 583 may be at least partially aligned in the Z-axis.

Figure 20A:
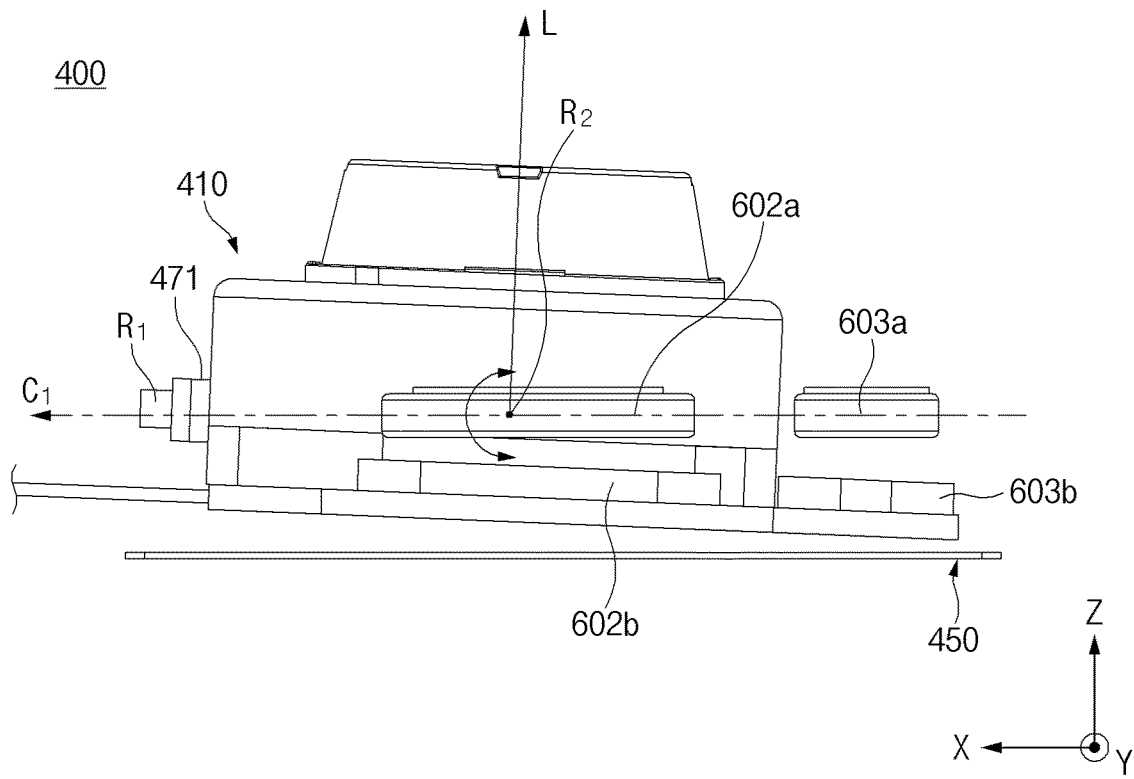
FIGS. 20A and 20B are views illustrating rotation of a camera assembly of the camera module illustrated in FIGS. 18A, 18B, 19A, and 19B according to various embodiments of the disclosure.
Figure 20B:
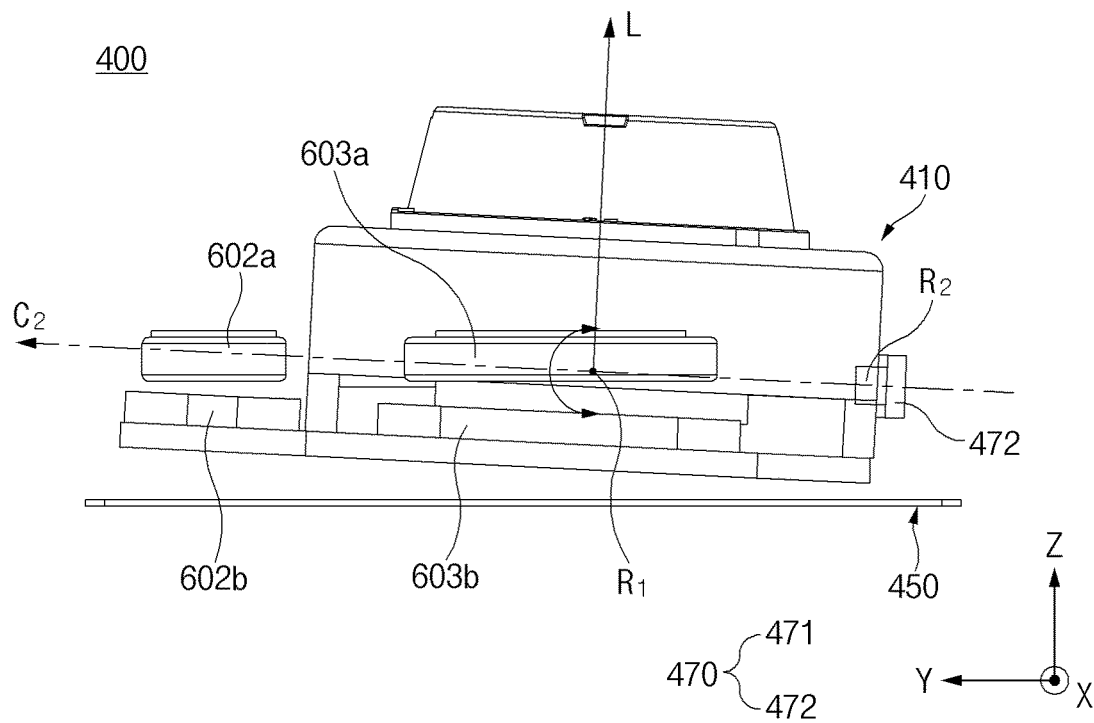

FIGS. 20A and 20B are views illustrating rotation of the camera assembly of the camera module illustrated in FIGS. 18A, 18B, 19A, and 19B according to various embodiments of the disclosure. FIGS. 20A and 20B illustrate the camera module in which a portion of the second camera housing is omitted for clarity.

Referring to FIG. 20A, it is a view illustrating second rotation of the camera assembly according to an embodiment of the disclosure.

Referring to FIG. 20B, it is a view illustrating first rotation of the camera assembly according to an embodiment of the disclosure.

In an embodiment, the first rotation may be rotation in which the camera assembly 410 rotates about the first rotation shaft R1, and the second rotation may be rotation in which the camera assembly 410 rotates about the second rotation shaft R2.

Referring to FIGS. 20A and 20B, the camera module 400 may include a first structure 602a, a second structure 602b that faces the first structure 602a and interacts electromagnetically with the first structure 602a, a third structure 603a, and/or a fourth structure 603b that faces the third structure 603a and interacts electromagnetically with the third structure 603a.

In an embodiment, each of the first structure 602a and the third structure 603a may be a structure disposed on and fixed to the second camera housing 450, and each of the second structure 602b and the fourth structure 603b may be a structure disposed on the camera assembly 410 and rotating together with the camera assembly 410. In an embodiment, the first structure 602a and the second structure 602b may be at least partially aligned in the Z-axis. In an embodiment, the third structure 603a and the fourth structure 603b may be at least partially aligned in the Z-axis.

In various embodiments, one of the first structure 602a and the second structure 602b may be a coil, and the other may be a magnetic body.

For example, the first structure 602a may be the second magnetic body 592 illustrated in FIGS. 18A and 18B, and the second structure 602b may be the second coil 582 illustrated in FIGS. 18A and 18B.

For example, the first structure 602a may be the second coil 582 illustrated in FIGS. 19A and 19B, and the second structure 602b may be the second magnetic body 592 illustrated in FIGS. 19A and 19B.

In various embodiments, attractive force or repulsive force may act between the first structure 602a and the second structure 602b. In various embodiments, the attractive force or the repulsive force may include magnetic force generated between the magnetic body and the coil. In various embodiments, the first structure 602a and the second structure 602b may be related to the first rotation of the camera assembly 410.

Referring to FIG. 20B, the camera assembly 410 may relatively rotate about the first rotation shaft R1 with respect to the second camera housing 450 together with the connection member 470. For example, the camera assembly 410 may be coupled to the connection member 470 in a direction that is perpendicular to the first rotation shaft R1 (e.g., coupled by the second rotation shaft R2) in order to integrally rotate together with the connection member 470. In the illustrated embodiment, a second virtual line C2 extending from the second rotation shaft R2 may be perpendicular to the optical axis L of the lens 431, but not perpendicular to the Z-axis.

For example, if the attractive force acts between the first structure 602a and the second structure 602b, the magnetic force may be applied to the camera assembly 410, in which the second structure 602b and the second structure 602b are disposed, in a direction closer to the first structure 602a. A rotation moment in the clockwise direction may act on the first rotation axis R1 based on the drawing. Thus, the camera assembly 410 may rotate about the first rotation shaft R1.

For example, if the repulsive force acts between the first structure 602a and the second structure 602b, the magnetic force may be applied to the second structure 602b and the camera assembly 410, on which the second structure 602b is disposed, in a direction away from the first structure 602a. A rotation moment in the counterclockwise direction may act on the first rotation axis R1 based on the drawing. Thus, the camera assembly 410 may rotate about the first rotation shaft R1 in the counterclockwise direction.

In various embodiments, one of the third structure 603a and the fourth structure 603b may be a coil, and the other may be a magnetic body. For example, the third structure 603a may be the third magnetic body 593 illustrated in FIGS. 18A and 18B, and the fourth structure 603b may be the third coil 583 illustrated in FIGS. 18A and 18B. Alternatively, for example, the third structure 603a may be the third coil 583 illustrated in FIGS. 19A and 19B, and the fourth structure may be the third magnetic body 593 illustrated in FIGS. 19A and 19B.

In various embodiments, attractive force or repulsive force may act between the third structure 603a and the fourth structure 603b. In various embodiments, the attractive force or the repulsive force may include magnetic force generated between the magnetic body and the coil. In various embodiments, the third structure 603a and the fourth structure 603b may be related to the second rotation of the camera assembly 410.

Referring to FIG. 20A, the camera assembly 410 may relatively rotate about the second rotation shaft R2 with respect to the second camera housing 450 and the connection member 470. For example, the connection member 470 may be coupled to the second camera housing 450 in a direction that is perpendicular to the second rotation shaft R2 (e.g., coupled by the first rotation shaft R1. Thus, the camera assembly 410 may rotate separately with respect to the connection member 470. In the illustrated embodiment, the first virtual line C1 extending from the first rotation axis R1 may be perpendicular to the Z-axis, but not perpendicular to the optical axis L of the lens 431.

For example, if the repulsive force acts between the third structure 603a and the fourth structure 603b, the magnetic force may be applied to the fourth structure 604b and the camera assembly 410, on which the fourth structure 603b is disposed, in a direction away from the third structure 603a. A rotation moment in the clockwise direction may act on the second rotation axis R2 based on the drawing. Thus, the camera assembly 410 may rotate about the second rotation shaft R2 in the clockwise direction.

For example, if the attractive force acts between the third structure 603a and the fourth structure 603b, the magnetic force may be applied to the fourth structure 603b and the camera assembly 410, on which the fourth structure 603b is disposed, in a direction that is closer to the fourth structure 603b. Here, a rotation moment in the counterclockwise direction may act on the second rotation axis R2. Thus, the camera assembly 410 may rotate about the second rotation shaft R2 in the counterclockwise direction.

A portable communication device 100 or electronic device 300 according to embodiments of the disclosure may include: a camera assembly 410 including a lens 431 and an image sensor 419; a printed circuit board (PCB) surrounding at least a portion of the camera assembly 410; a plurality of coils 481, 482, and 483 electrically connected to the PCB 460, wherein the plurality of coils 481, 482, and 483 include a first coil 481 disposed on a first area 461 of the PCB 460, a second coil 482 disposed on a second area 462 of the PCB 460, and a third coil 483 disposed on a third area of the PCB 460; and a control circuit (e.g., the processor of FIG. 1) electrically connected to the PCB 460, the first coil 481, the second coil 482, and the third coil 483, wherein the control circuit may be set in order to perform a first function related to the camera assembly 410 by moving the camera assembly 410 by using the first coil 481 in a direction substantially parallel to an optical axis L of the lens 431 and perform a second function related to the camera assembly 410 by rotating the camera assembly 410 about at least one rotation shaft R1 or R2, which is substantially perpendicular to the optical axis L, by using at least one of the second coil 482 or the third coil 483.

In various embodiments, the first function may include a function related to auto focusing, and the second function may include a function related to image stabilization.

In various embodiments, the image sensor 419 may be disposed to rotate together with the camera assembly 410 in relation to the second function.

In various embodiments, the portable communication device may include: a first magnetic body spaced apart from the first coil and substantially parallel to the first area; a second magnetic body spaced apart from the second coil and substantially parallel to the second area; and a third magnetic body spaced apart from the third coil and substantially parallel to the third area.

In various embodiments, the first magnetic body 491 may be disposed inside the camera assembly 410.

In various embodiments, at least one of the second magnetic body 492 and the third magnetic body 493 may be disposed outside the camera assembly 410.

In various embodiments, the first magnetic body 491 may be disposed so as not to be substantially affected by electromagnetic fields generated from the second coil 482 or the third coil 483.

In various embodiments, the first area 461 may extend substantially parallel to the third area 463.

In various embodiments, the first area 461 may extend substantially perpendicular to the second area 462.

In various embodiments, the first area 461 may extend substantially perpendicular to the second area 462, and the third area 463 may be disposed to extend substantially perpendicular to the second area 462 and face the first area 461.

In various embodiments, the first area 461, the second area 462, and the third area 463 may face a direction that is substantially perpendicular to the optical axis L.

In various embodiments, the portable communication device may further include a first camera housing 420 accommodating at least a portion of the lens 431 and at least a portion of the image sensor 419 and provided in the camera assembly 410; a second camera housing 450 accommodating at least a portion of the first camera housing 420, and a connection member 470 disposed between the first camera housing 420 and the second camera housing 450.

In various embodiments, the at least one rotation shaft may include a first rotation shaft R1 and a second rotation shaft R2 that is perpendicular to the first rotation shaft R1, wherein the connection member 470 may be connected to the first camera housing 420 and the second camera housing 450 so that the camera assembly rotates about the first rotation shaft R1 and/or the second rotation shaft R2.

In various embodiments, the connection member 470 may include a first protrusion protruding toward the second camera housing 450 and a second protrusion 475 protruding toward the first camera housing 420, wherein the second camera housing may include a first hole into which at least a portion of the first protrusion is inserted, wherein the first camera housing 420 may include a second hole 4131 into which at least a portion of the second protrusion 475 is inserted.

In various embodiments, an opening is defined in a surface facing the PCB 460 of the first camera housing 420, wherein at least one of the first coil 481, the second coil 482, or the third coil 483 is disposed in the opening.

In various embodiments, the portable communication device may include a second camera housing 450 in which the camera assembly 410 is accommodated, wherein at least one of the first area 461, the second area 462, or the third area 463 faces the camera assembly 410, wherein at least the other of the first area 461, the second area 462, or the third area 463 faces the second camera housing 450.

In various embodiments, the at least one rotation shaft may include a first rotation shaft R1 and a second rotation shaft R2 disposed in a direction different from the first rotation shaft R1, wherein the control circuit (e.g., the processor 120 of FIG. 1) may perform the second function by rotating the camera assembly 410 about the first rotation shaft R1 by using the second coil 482 and by rotating the camera assembly 410 about the second rotation shaft R2 by using the third coil 483.

In various embodiments, the first rotation shaft R1 and the second rotation shaft R2 may be substantially perpendicular to each other.

In various embodiments, the portable communication device may include a coil driver (e.g., the driving circuit 468) electrically connected to the control circuit in order to control at least one corresponding coil among the first coil 481, the second coil 482, or the third coil 483 in relation to the performance of the first function or the second function, wherein the coil driver may be disposed on a fourth area (e.g., the extension portion 469 of FIG. 4 and the fifth area 465 of FIG. 14) extending from at least one of the first area 461, the second area 462, or the third area 463 of the PCB.

In various embodiments, the control circuit may include an application processor (e.g., the processor 120 of FIG. 1).

In various embodiments, the portable communication device may include the other PCB 460 disposed outside the camera assembly 410, wherein the control circuit may be disposed on the other PCB 460.

In various embodiments, the PCB 460 may be at least partially flexible.

A portable communication device 100 or electronic device 300 according to embodiments of the disclosure may include: a camera assembly 410 including a lens 431 and an image sensor 419; a plurality of printed circuit boards (PCB) 460 surrounding at least a portion of the camera assembly 410, wherein the plurality of PCBs 460 may include a first PCB (e.g., reference numeral 510 of FIGS. 17, 19A, and 19B) and a second PCB (e.g., reference numeral 520 of FIGS. 17, 19A, and 19B); a plurality of coils electrically connected to the plurality of PCB 460 and including a first coil (e.g., reference numeral 581 of FIGS. 17, 19A, and 19B), a second coil (e.g., reference numeral 582 of FIGS. 17, 19A, and 19B), and a third coil (e.g., reference numeral 583 of FIGS. 17, 19A, and 19B), wherein at least one of the first coil (e.g., reference numeral 581 of FIGS. 17, 19A, and 19B), the second coil (e.g., reference numeral 582 of FIGS. 17, 19A, and 19B), or the third coil (e.g., reference numeral of FIGS. 17, 19A, and 19B) may be disposed on the first PCB, and at least the other of the first coil (e.g., reference numeral 581 of FIGS. 17, 19A, and 19B), the second coil (e.g., reference numeral 582 of FIGS. 17, 19A, and 19B), or the third coil (e.g., reference numeral 583 of FIGS. 17, 19A, and 19B) may be disposed on the second PCB 520; and a control circuit (e.g., the processor 120 of FIG. 1) electrically connected to the plurality of PCBs 460 and the plurality of coils, wherein the control circuit may be set in order to perform a first function related to the camera assembly 410 by moving the camera assembly 410 by using the first coil (e.g., reference numeral 581 of FIGS. 17, 19A, and 19B) in a direction that is substantially parallel to an optical axis L of the lens 431 and perform a second function related to the camera assembly 410 by rotating the camera assembly 410 about at least one rotation shaft R1 or R2, which is substantially perpendicular to the optical axis L, by using at least one of the second coil (e.g., reference numeral 582 of FIGS. 17, 19A, and 19B) or the third coil (e.g., reference numeral 583 of FIGS. 17, 19A, and 19B).

A camera module 400 according to embodiments of the disclosure may include: a camera assembly 410 including a lens 431 and an image sensor 419; a printed circuit board (PCB) surrounding at least a portion of the camera assembly 410; a plurality of coils electrically connected to the PCB 460, wherein the plurality of coils include a first coil 481 disposed on a first area 461 of the PCB 460, a second coil 482 disposed on a second area 462 of the PCB 460, and a third coil 483 disposed on a third area of the PCB 460; and a controller (e.g., a driving circuit 468 of FIG. 14) electrically connected to the PCB 460 and the plurality of coils, wherein the controller may be set in order to perform a first function related to the camera assembly 410 by moving the camera assembly 410 by using the first coil 481 in a direction substantially parallel to an optical axis L of the lens 431 and perform a second function related to the camera assembly 410 by rotating the camera assembly 410 about at least one rotation shaft R1 or R2, which is substantially perpendicular to the optical axis L, by using at least one of the second coil 482 or the third coil 483.

A portable communication device 100 or electronic device 300 according to embodiments of the disclosure may include: a housing 310 (e.g., reference numeral 310 of FIGS. 3A, 3B, and 3C) defining at least a portion of an outer surface of the portable communication device; a display 301 accommodated in the housing 310; and a camera assembly 410, wherein the camera assembly 410 may include: a first camera housing 420; a lens assembly (e.g., the lens assembly 210 of FIG. 2) at least partially accommodated in the first camera housing 420 and including a plurality of lenses 431; an image sensor 419 accommodated in the first camera housing 420; a printed circuit board 460 at least partially surrounding the first camera housing 420, wherein the printed circuit board 460 may include a first area 461 corresponding to a first side surface (e.g., the first side surface 413-1) of the first camera housing 420, a second area 462 corresponding to a second side surface (e.g., the fourth side surface 413-4) of the first camera housing 420, which is adjacent to the first side surface 413-1, and a third area 463 corresponding to a third side surface (e.g., the second side surface 413-2) of the first camera housing 420, which is adjacent to the second side surface (e.g., the fourth side surface 413-4) and faces the first side surface (e.g., the first side surface 413-1); and a first coil disposed on the first area 461, a second coil disposed on the second area 462, and a third coil 483 disposed on the third area 463; and a processor 120 functionally connected to the camera assembly 410, wherein the processor 120 may be set in order to perform a first function related to the camera assembly 410 by moving the camera assembly 410 by using the first coil 481 in a direction substantially parallel to an optical axis L of at least one lens 431 of the plurality of lenses 431 and perform a second function related to the camera assembly 410 by moving the camera assembly 410 about at least one rotation shaft R1 or R2, which is substantially perpendicular to the optical axis L, by using at least one of the second coil 482 or the third coil 483.

In various embodiments, the portable communication device 100 or electronic device 300 may include a second camera housing 450 at least partially surrounding the first camera housing 420, a first magnetic body 491 corresponding to the first coil 481, a second magnetic body 492 corresponding to the second coil 482, and a third magnetic body 493 corresponding to the third coil, wherein the first magnetic body 491 may be accommodated in the first camera housing 420, and the second magnetic body 492 or the third magnetic body 493 may be disposed in the second camera housing 450.

The camera module according to the embodiments disclosed in the disclosure may provide the function related to the image stabilization in addition to the function related to the auto focusing.

In addition, the various effects that are directly or indirectly identified through the disclosure may be provided.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C" may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with" or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable communication device comprising:
   a first camera housing;
   a camera assembly disposed inside the first camera housing, wherein the camera assembly comprises a lens assembly comprising a lens, an image sensor, and a frame in which the lens assembly and the image sensor are disposed;
   a printed circuit board (PCB) configured to surround a side surface of the frame, wherein the PCB comprises an inner surface facing the side surface of the frame and an outer surface facing opposite the inner surface;
   a plurality of coils electrically connected to the PCB, wherein the plurality of coils comprises:
      a first coil disposed on the inner surface of a first area of the PCB,
      a second coil disposed on the outer surface of a second area of the PCB, and
      a third coil disposed on the outer surface of a third area of the PCB; and
   a control circuit electrically connected to the PCB, the first coil, the second coil, and the third coil, and configured to:
      perform a first function related to the camera assembly by moving the lens assembly relative to the frame, by using the first coil, in a direction substantially parallel to an optical axis of the lens, and
      perform a second function related to the camera assembly by rotating the camera assembly relative to the first camera housing about at least one rotation shaft, the at least one rotation shaft being substantially perpendicular to the optical axis, by using at least one of the second coil or the third coil.

2. The portable communication device of claim 1, wherein the first function comprise a function related to focusing, and the second function comprises a function related to image stabilization.

3. The portable communication device of claim 1, wherein the image sensor is disposed to rotate together with the camera assembly when the second function is performed.

4. The portable communication device of claim 1, further comprising:
   a first magnetic body spaced apart from the first coil and substantially parallel to the first area;
   a second magnetic body spaced apart from the second coil and substantially parallel to the second area; and
   a third magnetic body spaced apart from the third coil and substantially parallel to the third area.

5. The portable communication device of claim 4, wherein the first magnetic body is disposed inside the camera assembly.

6. The portable communication device of claim 4, wherein at least one of the second magnetic body or the third magnetic body is disposed outside the camera assembly.

7. The portable communication device of claim 1, wherein the first area is disposed substantially parallel to the third area.

8. The portable communication device of claim 1,
   wherein the first area is disposed substantially perpendicular to the second area, and
   wherein the third area is disposed substantially perpendicular to the second area and facing the first area.

9. The portable communication device of claim 1, wherein the first area, the second area, and the third area each face a direction that is substantially perpendicular to the optical axis.

10. The portable communication device of claim 1, further comprising:

a second camera housing configured to accommodate at least a portion of the lens and at least a portion of the image sensor, and comprising the frame and a cover coupled to the frame; and a connection member disposed between the first camera housing and the second camera housing, wherein the at least a portion of the second camera housing is partially accommodated inside the first camera housing, and wherein the camera assembly comprises the second camera housing, the lens assembly, and the image sensor.

11. The portable communication device of claim 10, wherein the at least one rotation shaft comprises a first rotation shaft and a second rotation shaft that is perpendicular to the first rotation shaft, wherein the connection member is connected to the first camera housing and the second camera housing so that the camera assembly rotates about the first rotation shaft or the second rotation shaft.

12. The portable communication device of claim 10, wherein the connection member comprises a first protrusion protruding toward the first camera housing and a second protrusion protruding toward the second camera housing, wherein the first camera housing comprises a first hole into which at least a portion of the first protrusion is inserted, and wherein the second camera housing comprises a second hole into which at least a portion of the second protrusion is inserted.

13. The portable communication device of claim 10, wherein an opening is defined in a surface facing the PCB of the second camera housing, and wherein at least one of the first coil, the second coil, or the third coil is disposed in the opening.

14. The portable communication device of claim 1, further comprising:

a connection member connected to the first camera housing and the frame, wherein a first hole into which at least a portion of one end of the connection member is inserted is defined in the first camera housing, and wherein a second hole into which at least a portion of the other end of the connection member is inserted is defined in the frame.

15. The portable communication device of claim 1, wherein the at least one rotation shaft comprises a first rotation shaft and a second rotation shaft disposed in a direction different from the first rotation shaft, and wherein the control circuit performs the second function by rotating the camera assembly about the first rotation shaft by using the second coil and by rotating the camera assembly about the second rotation shaft by using the third coil.

16. The portable communication device of claim 15, wherein the first rotation shaft and the second rotation shaft are substantially perpendicular to each other.

17. The portable communication device of claim 1, further comprising:

a coil driver electrically connected to the control circuit and configured to control at least one corresponding coil among the first coil, the second coil, or the third coil in relation to the performance of the first function or the second function, wherein the coil driver is disposed on a fourth area extending from at least one of the first area, the second area, or the third area.

18. The portable communication device of claim 1, wherein the control circuit comprises an application processor.

19. The portable communication device of claim 1, further comprising:

another PCB disposed outside the camera assembly, wherein the control circuit is disposed on the other PCB.

20. The portable communication device of claim 1, wherein the PCB is at least partially flexible.

* * * * *